US012679566B2

(12) United States Patent
Carnegie

(10) Patent No.: US 12,679,566 B2
(45) Date of Patent: Jul. 14, 2026

(54) ARCHWAY ASSEMBLY FOR A CIRCUIT BASED VEHICLE

(71) Applicant: Cameron Carnegie, Merritt Island, FL (US)

(72) Inventor: Cameron Carnegie, Merritt Island, FL (US)

( * ) Notice: Subject to any disclaimer, the term of this patent is extended or adjusted under 35 U.S.C. 154(b) by 0 days.

(21) Appl. No.: 19/209,483

(22) Filed: May 15, 2025

(65) Prior Publication Data

US 2025/0269986 A1      Aug. 28, 2025

Related U.S. Application Data

(60) Division of application No. 17/853,081, filed on Jun. 29, 2022, now Pat. No. 12,338,007, which is a continuation-in-part of application No. 17/571,131, filed on Jan. 7, 2022, now Pat. No. 11,414,182.

(60) Provisional application No. 63/136,105, filed on Jan. 11, 2021.

(51) Int. Cl.
| | |
|---|---|
| *B64U 30/26* | (2023.01) |
| *B64U 10/13* | (2023.01) |
| *B64U 101/60* | (2023.01) |

(52) U.S. Cl.
CPC ............. *B64U 10/13* (2023.01); *B64U 30/26* (2023.01); *B64U 2101/60* (2023.01)

(58) Field of Classification Search
CPC .......... B64U 30/26; B64C 23/08; B64C 23/02
See application file for complete search history.

(56) References Cited

U.S. PATENT DOCUMENTS

| | | | | |
|---|---|---|---|---|
| 1,674,169 | A | | 6/1928 | Flettner |
| 3,071,334 | A | * | 1/1963 | Barnes .................... B64C 23/08 |
| | | | | 244/23 C |
| 4,398,895 | A | | 8/1983 | Asker |
| 5,180,119 | A | | 1/1993 | Picard |
| 5,875,627 | A | * | 3/1999 | Jeswine .................. B64C 23/08 |
| | | | | 60/221 |
| 6,622,973 | B2 | | 9/2003 | Al-Garni |
| 8,387,911 | B2 | | 3/2013 | Collette |
| 9,816,464 | B2 | * | 11/2017 | Seifert .................... F02K 1/008 |
| 9,960,595 | B2 | | 5/2018 | Bethel et al. |
| 10,118,696 | B1 | | 11/2018 | Hoffberg |

(Continued)

FOREIGN PATENT DOCUMENTS

| | | | | | |
|---|---|---|---|---|---|
| DE | | 19715827 | A1 * | 10/1998 | ........... B64C 39/005 |
| EA | | 032549 | B1 * | 6/2019 | ............. B64C 25/10 |

(Continued)

OTHER PUBLICATIONS

U.S. Appl. No. 13/823,317, filed Jul. 18, 2013, Akhmejanov.
U.S. Appl. No. 13/133,612, filed Sep. 29, 2011, Levander.
U.S. Appl. No. 13/006,932, filed May 10, 2012, Kummer.

*Primary Examiner* — Christopher P Ellis
(74) *Attorney, Agent, or Firm* — Stephen Bullock; Bullock Law

(57) ABSTRACT

A circuit-based vehicle archway assembly having an arched casing with a cylinder ramp at one end and an opposing semi-oval end. It includes a plurality of rotational cylinders within the casing and has respective airfoil bridges between the rotational cylinders. The airfoil bridges and cylinder ramps may be structured to create a cambered hybrid magnus lift airfoil assembly generating directional force to a circuit-based vehicle.

5 Claims, 27 Drawing Sheets

(56)        References Cited

U.S. PATENT DOCUMENTS

| | | | | |
|---|---|---|---|---|
| 10,427,784 | B2 | 10/2019 | Parks | |
| 10,669,026 | B2 | 6/2020 | Aguilar | |
| 10,787,254 | B1 | 9/2020 | Chen | |
| 10,814,967 | B2 | 10/2020 | Groninga | |
| 11,414,182 | B1 * | 8/2022 | Carnegie | B64U 30/00 |
| 12,377,964 | B2 * | 8/2025 | Viyurkov | B64U 10/10 |
| 2010/0281874 | A1 * | 11/2010 | Rice | B64C 15/02 |
| | | | | 60/770 |
| 2016/0327073 | A1 * | 11/2016 | Amlani | F15D 1/007 |
| 2018/0155045 | A1 * | 6/2018 | Suciu | B64D 27/31 |
| 2020/0198772 | A1 * | 6/2020 | Akhmejanov | B64C 29/00 |
| 2020/0307767 | A1 * | 10/2020 | Greenberg | B64C 29/0025 |
| 2022/0009618 | A1 * | 1/2022 | Fine | B64C 3/28 |
| 2022/0387929 | A1 * | 12/2022 | Grimes | B64D 11/02 |
| 2024/0336350 | A1 * | 10/2024 | Schlunke | B64C 15/14 |
| 2025/0269986 | A1 * | 8/2025 | Carnegie | B64U 20/73 |
| 2026/0015080 | A1 * | 1/2026 | Eleryan | B64C 13/16 |

FOREIGN PATENT DOCUMENTS

| | | | | | |
|---|---|---|---|---|---|
| EP | 0468894 | A1 * | 1/1992 | | B64C 23/08 |
| FR | 2986210 | A1 * | 8/2013 | | B64C 15/14 |
| GB | 2560493 | A * | 9/2018 | | B64C 21/00 |
| RU | 2711768 | C1 * | 1/2020 | | B64C 29/00 |
| WO | WO-2018130745 | A1 * | 7/2018 | | B63H 9/02 |
| WO | WO-2019074349 | A1 * | 4/2019 | | B64C 25/10 |
| WO | WO-2020157052 | A1 * | 8/2020 | | B64U 30/20 |
| WO | WO-2021144485 | A1 * | 7/2021 | | B64D 27/355 |

* cited by examiner

FIG. 11B          FIG. 11C

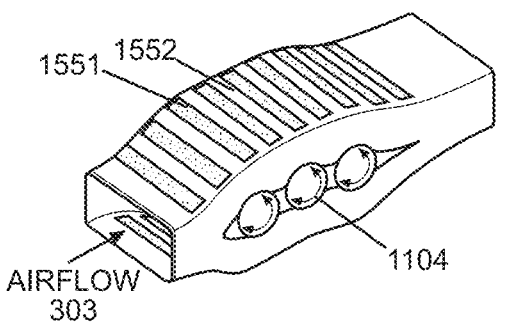
FIG. 15E
FIG. 15F
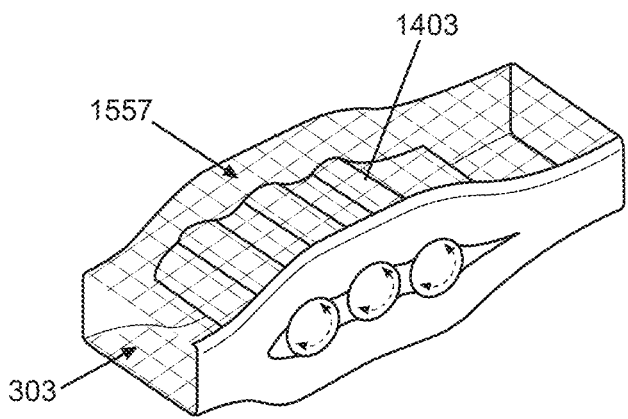
FIG. 15G

ARCHWAY ASSEMBLY FOR A CIRCUIT BASED VEHICLE

FIELD OF THE INVENTION

The present invention relates to systems and methods for aerial vehicles. In particular, the present invention relates to structural and functional improvements to aerial vehicles and associated methods.

BACKGROUND

The future of Aerial Vehicles gives consumers a convenient means to receive home and business deliveries directly to their doorstep. Furthermore, systemic use of aerial vehicle deliveries can help provide a contactless method to prevent the spread of infectious diseases.

However, current aerial vehicle designs use a variety of methods that are unsafe for close public interaction. These include the use of propellers that expose the public to injury from contact with the blades. They also include the use of turbine or rocket type propulsion that could expose the public to unintended eruptions and burns.

There exists a need in the art for an aerial vehicle that can safely come into close contact with members of the public for package delivery and interaction. Therefore, there exists a need for a circuit-based aerial vehicle.

SUMMARY OF THE INVENTION

An embodiment of the present invention includes a circuit-based vehicle archway assembly having an arched casing with a cylinder ramp at one end and an opposing semi-oval end. It includes a plurality of rotational cylinders within the casing and has respective airfoil bridges between the rotational cylinders. The airfoil bridges and cylinder ramps may be structured to create a cambered hybrid magnus lift airfoil assembly generating directional force to a circuit-based vehicle.

In this embodiment, the casing may include actuating louvered doors that slidably engage a track along the arched casing ridges. The actuating louvered doors may be structured to open, close, partially open and partially close to control venting. The degree to which the louvered doors are vented may be based on the spin rate of the plurality of rotational cylinders and rate of air flow through the circuit-based vehicle. Furthermore, the archway assembly casing may include a semi-permeable mesh surface. Additionally, the plurality of rotational cylinders may include at least one of two and three rotational cylinders configured in a parallel orientation.

BRIEF DESCRIPTION OF THE DRAWINGS

FIG. 11B is a perspective view of an individual component found in the circuit-based UAV according to an embodiment of the invention.

FIG. 11C is a perspective view of an individual component found in the circuit-based UAV according to an embodiment of the invention.

FIG. 15E is a perspective view of an individual component found in the circuit-based UAV illustrated in FIG. 12 according to an embodiment of the invention.

FIG. 15F is a perspective view of an individual component found in the circuit-based UAV illustrated in FIG. 12 according to an embodiment of the invention.

FIG. 15G is a perspective view of an individual component found in the circuit-based UAV illustrated in FIG. 12 according to an embodiment of the invention.

FIG. 16K is a perspective view of individual componentry found in the circuit-based UAV illustrated in FIG. 12.

FIG. 16L is a perspective view of individual componentry found in the circuit-based UAV illustrated in FIG. 12.

FIG. 16M is a side view of individual componentry found in the circuit-based UAV illustrated in FIG. 12.

FIG. 16N is a side view of individual componentry found in the circuit-based UAV illustrated in FIG. 12.

FIGS. 16K-16N are perspective and side views of a segment of one side of the circuit-based UAV illustrated in FIG. 12 according to an embodiment.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
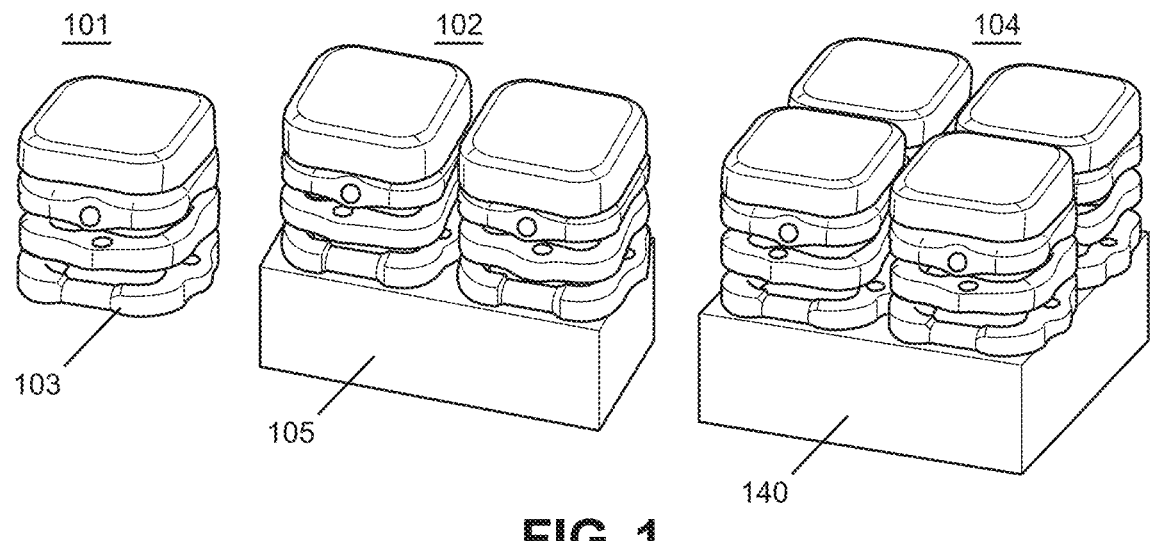
FIG. 1 is a perspective view of three configurations of a circuit based aerial vehicle according to an embodiment of the invention.

FIG. 1 illustrates a circuit based aerial vehicle, hereinafter aerial vehicle 100, according to an embodiment of the invention. As shown, the aerial vehicle 100 may include a single-cell vehicle 101 structured to carry an internal payload 103, a double-cell vehicle 102 structured to carry an external payload 105, and a quad-cell vehicle 104 structured to carry an external payload 140.

Figure 2:
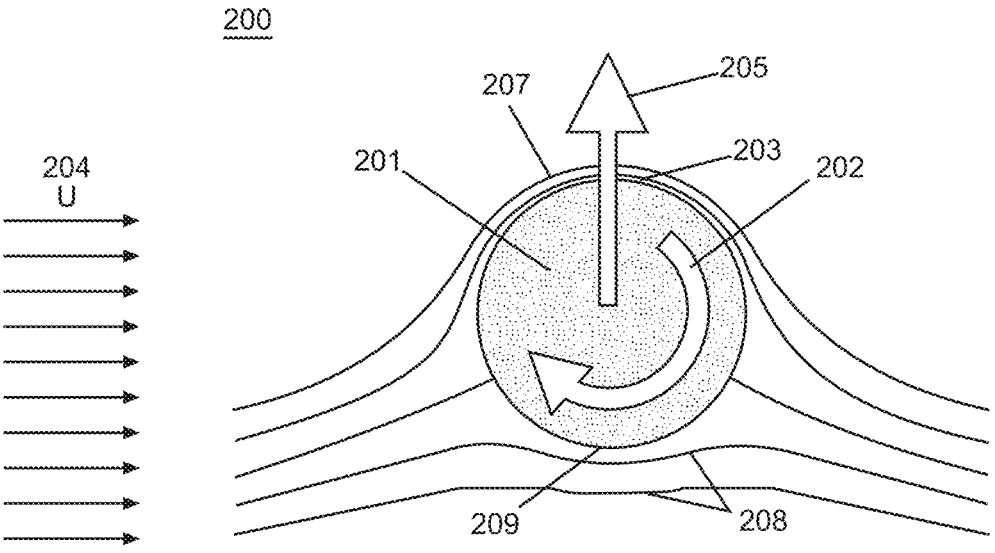
FIG. 2 is a diagrammatic view of the magnus effect used within the invention.

FIG. 2 demonstrates a fundamental characteristic of the improved aerial vehicle 100 referred to in the art as the magnus effect. As shown, lift force 205 is generated when an airflow field 204 passes over a rotating cylinder 201 with a spin direction 202 oriented such that the upper surface 203 of the rotating cylinder 201 moves in the same direction as the airflow field 204. Compacted streamlines 207 may form against the portion of the rotating cylinder 201 moving with the airflow field 204 and separated streamlines 208 may form on the portion of the rotating cylinder 201 moving against the airflow field 204.

Higher velocity and lower pressure are associated with the compacted streamlines 207 above the upper surface 203 of the rotating cylinder 201 relative to the lower surface 209 of the rotating cylinder 201. This may cause a pressure differential between the upper surface 203 and lower surface 209. The resulting lift force 205 to the entire rotating cylinder 201 may be estimated with the magnus effect. Should the rotating cylinder 201 reverse its spin direction 202 such that the lower surface 209 moves with the airflow field 204, the lift force 205 reverses, creating negative lift or downward force as oriented in FIG. 2.

Figure 3:
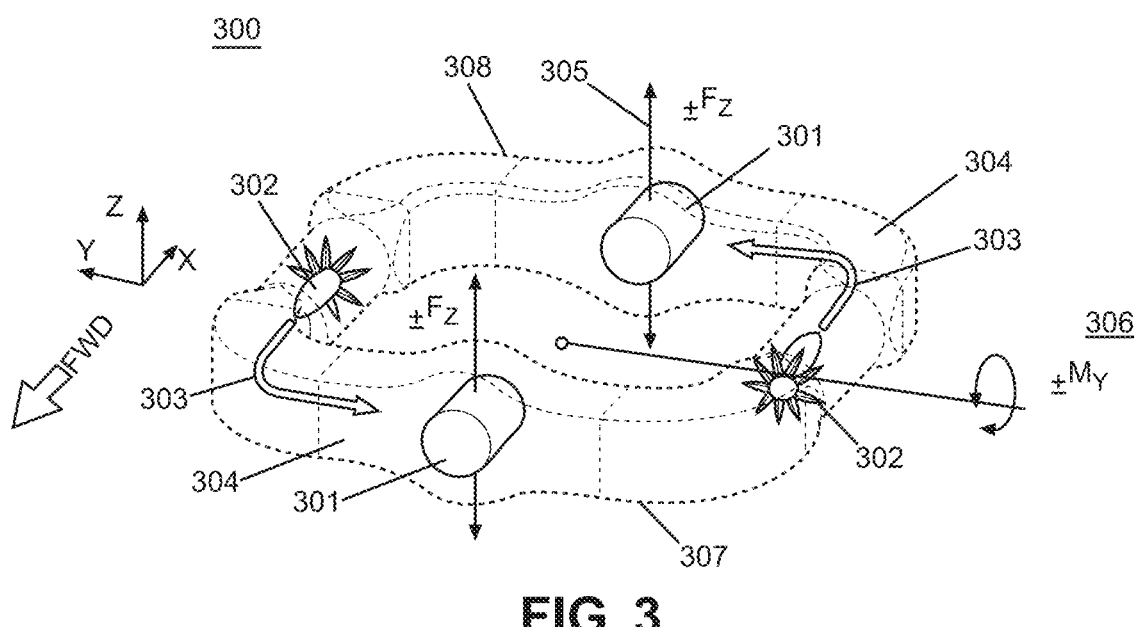
FIG. 3 is an interior perspective front view of a vertical z-force lift circuit according to an embodiment of the invention.
Figure 3A:
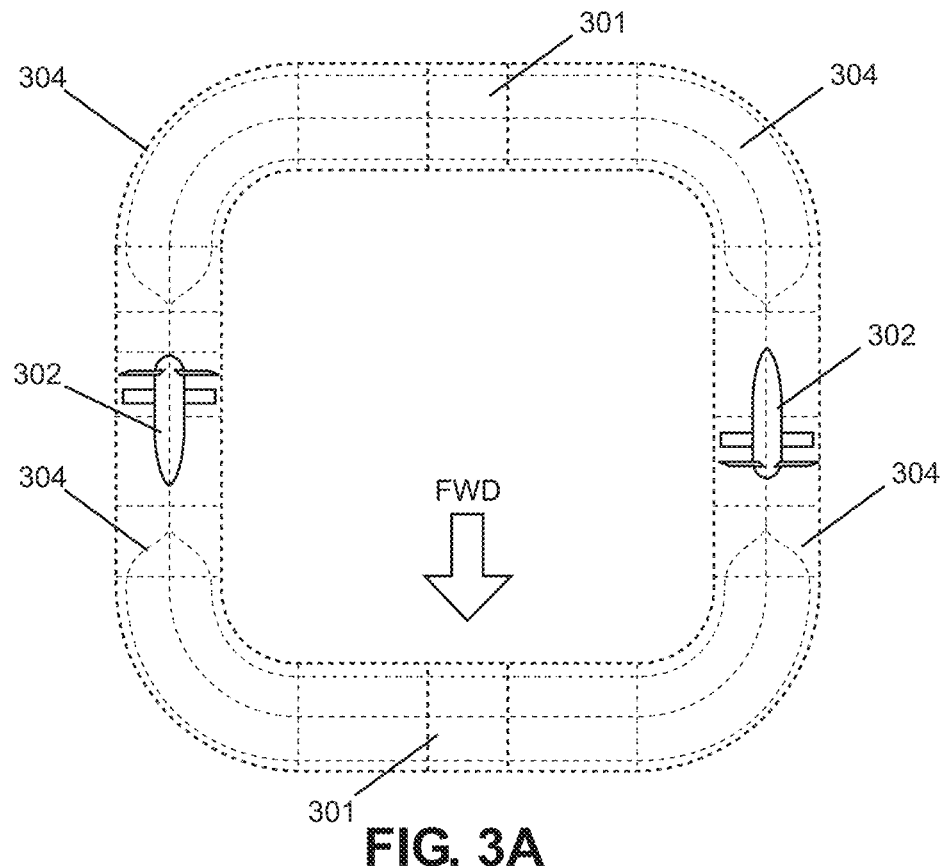
FIG. 3A is a top-down interior view of a vertical z-force lift circuit according to an embodiment of the invention.

FIGS. 3 and 3A illustrate a segment of the aerial vehicle 100 defined as a vertical z-force lift circuit 300. The vertical z-force lift circuit 300 may be an enclosed air duct 304 system. In some embodiments, the vertical z-force lift circuit 300 may be generally square or rectangular in shape. However, one skilled in the art will appreciate that other shapes of the circuits described herein are contemplated to be within the scope of this application including circular and polygonal. For purposes of clarity, the generally square embodiment will be used for reference.

The vertical z-force lift circuit 300 may include a plurality of horizontally oriented rotational cylinders 201, defined as horizontal cylinders 301. The horizontal cylinders 301 may be medially located within the air duct 304 at opposing sides. As shown, one horizontal cylinder 301 may be positioned medially within the front 307 of the vertical z-force lift circuit 300 and one horizontal cylinder 301 may be positioned medially within the rear 308 of the vertical z-force lift circuit 300. Furthermore, the enclosed air duct 304 system may also include a plurality of fans 302 positioned on opposing sides adjacent to the horizontal cylinders 301. As shown, one fan 302 may be positioned medially within the first side 311 of the vertical z-force lift circuit 300 and one fan 302 may be positioned medially within the second side 312 of the vertical z-force lift circuit 300.

The fans 302 may generate airflow 303 through the air duct 304 and over the horizontal cylinders 301. As depicted, airflow 303 is moving in a counter clockwise direction and circulating through the enclosed air duct 304 system and around the vertical z-force lift circuit 300. Depending on the direction each horizontal cylinder 301 is being rotated, positive or negative lift force 305 may be generated causing that portion of the vertical z-force lift circuit 300 to either ascend or descend. If working in unison, the entire vertical z-force lift circuit 300 may ascend or descend. If working separately, rotational pitch movement 306 may be generated depending on the spin direction 202 of the horizontal cylinders 301. In some embodiments, the direction of the airflow 303 via the fans 302 rather than the spin direction 202 of the horizontal cylinders 301 may be reversed to create positive or negative lift 305.

Figure 3B:
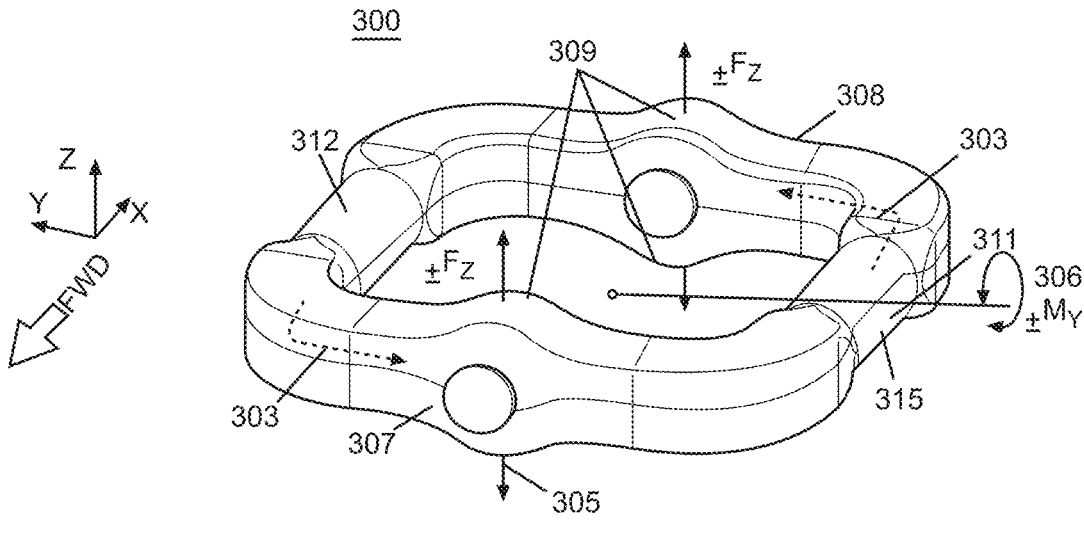
FIG. 3B is a perspective front view of a vertical z-force lift circuit exterior according to an embodiment of the invention.

FIG. 3B illustrates the contours of the vertical z-force lift circuit 300 including the vertical archways 309 surrounding the horizontal cylinders 301 and the elongate fan tunnels 315 surrounding the fans 302. Each structured segment serves as a means to guide airflow 303 in the intended direction. It should be noted that the depicted figures within this application are not necessarily drawn to scale. Furthermore, one skilled in the art will appreciate that the elongate fan tunnels 315, fans 302 and air ducts 304 may be larger or smaller depending on need, preference, and circumstance.

The elongate fan tunnels 315 may be cylindrical air ducts 304 on the first and second sides 311, 312 that surround the fans 302. The elongate fan tunnels 315 may direct airflow 303 along the first and second sides 311, 312 around corner portions of the vertical z-force lift circuit 300 toward each vertical archway 309.

The vertical archways 309 may be undulated portions of the air duct 304 creating a bell curve swell overtop and underneath the horizontal cylinders 301. Therefore, the highest point of the bell curve may correspond to a midpoint of the horizontal cylinder 301 longitudinal axis. Additionally, the vertical archways 309 may include tapered ends that align with the rest of their respective air ducts 304 running generally perpendicular to the longitudinal axes of the horizontal cylinders 301. As shown, both positive and negative lift force 305 may be generated at the vertical archways 309 to enable the entire vertical z-force lift circuit 300 to ascend, descend, or rotationally pitch 306.

Figure 4:
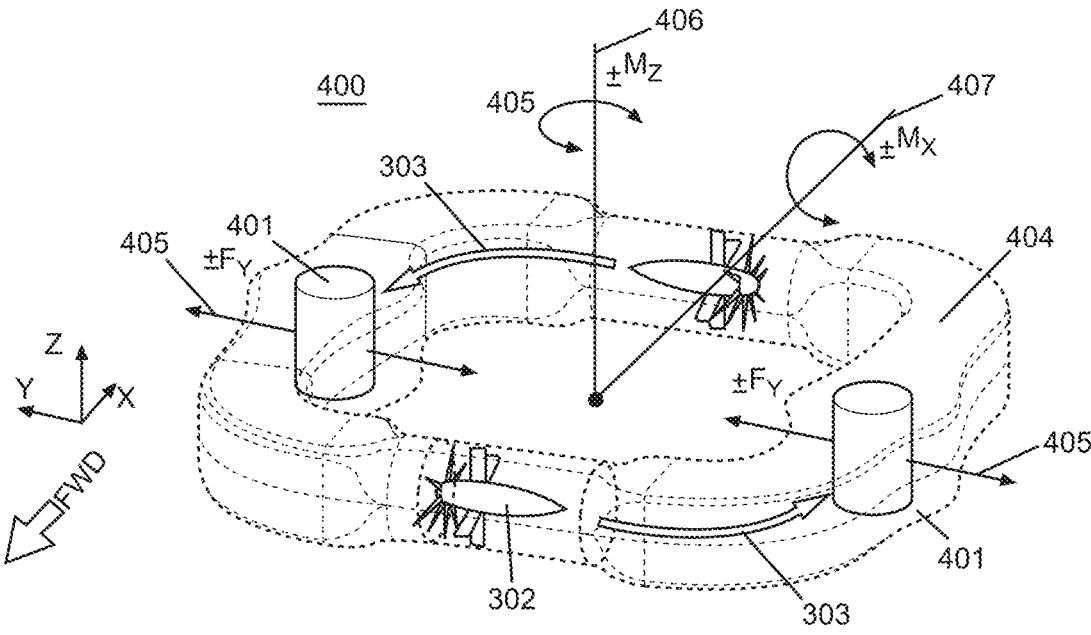
FIG. 4 is an interior perspective front view of a lateral y-force circuit according to an embodiment of the invention.

FIG. 4 illustrates a segment of the aerial vehicle 100 defined as a lateral y-force circuit 400. Like the vertical z-force lift circuit 300, the lateral y-force circuit 400 may be an enclosed air duct 304 system. In some embodiments, the lateral y-force circuit 400 may be generally square or rectangular in shape and may align vertically with the vertical z-force lift circuit 300.

The lateral y-force circuit 400 may include a plurality of vertically oriented rotational cylinders 201, defined as vertical cylinders 401. The vertical cylinders 401 may be located within the air duct 404 at opposing sides. As shown, one vertical cylinder 401 may be positioned within the first side 311 of the lateral y-force circuit 400 and one vertical cylinder 401 may be positioned within the second side 312 of the lateral y-force circuit 400. Furthermore, the enclosed air duct 404 system may also include a plurality of fans 302 positioned on opposing sides adjacent the vertical cylinders 401. As shown, one fan 302 may be positioned medially within the front 307 of the lateral y-force circuit 400 and one fan 302 may be positioned medially within the rear 308 of the lateral y-force circuit 300.

The fans 302 may generate airflow 303 through the air duct 404 and around the vertical cylinders 401. As depicted, airflow 303 is moving in a counter clockwise direction and circulating through the enclosed air duct 404 system and around the lateral y-force circuit 400. Depending on the direction each vertical cylinder 401 is being rotated, positive or negative lateral force 405 may be generated causing that portion of the lateral y-force circuit 400 to move right or left. If working in unison, the entire lateral y-force circuit 400 may move in the positive or negative y-direction.

By way of non-limiting example, the lateral y-force circuit 400 may be used to steady the aerial vehicle 100 in the presence of a lateral wind by moving contra thereto. By reversing the spin direction 202 of the vertical cylinders 401 as opposed to reversing the direction of the airflow 303, the lateral y-force circuit 400 may quickly respond to changing external conditions.

Figure 4A:
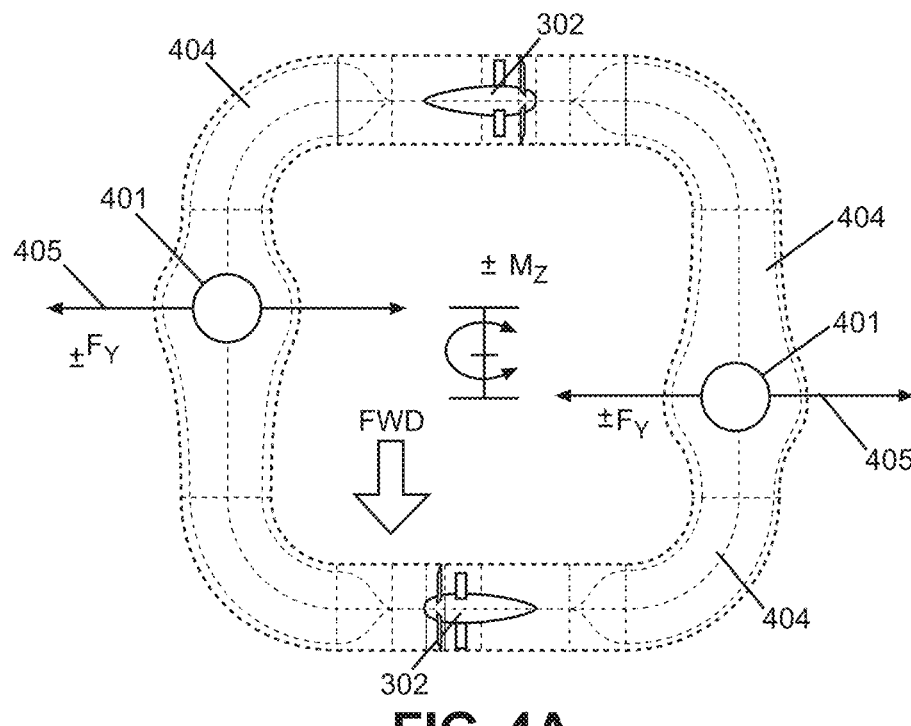
FIG. 4A is a top-down interior view of a lateral y-force circuit according to an embodiment of the invention.

FIG. 4A shows a top-down view of the lateral y-force circuit 400 demonstrating that the vertical cylinders 401 may be asymmetrically offset from each other on the first and second sides 311, 312. This may create a moment arm between the two force Fy vectors and a rotational moment 406 about the z-axis. This may allow for the lateral y-force circuit 400, and resulting aerial vehicle 100 to spin or have yaw control. If the lateral y-force circuit 400 is placed low on the aerial vehicle 100 below its center of gravity (CG), then the vertical cylinders 401 may create a moment Mx about the x-axis to create roll control.

Figure 4B:
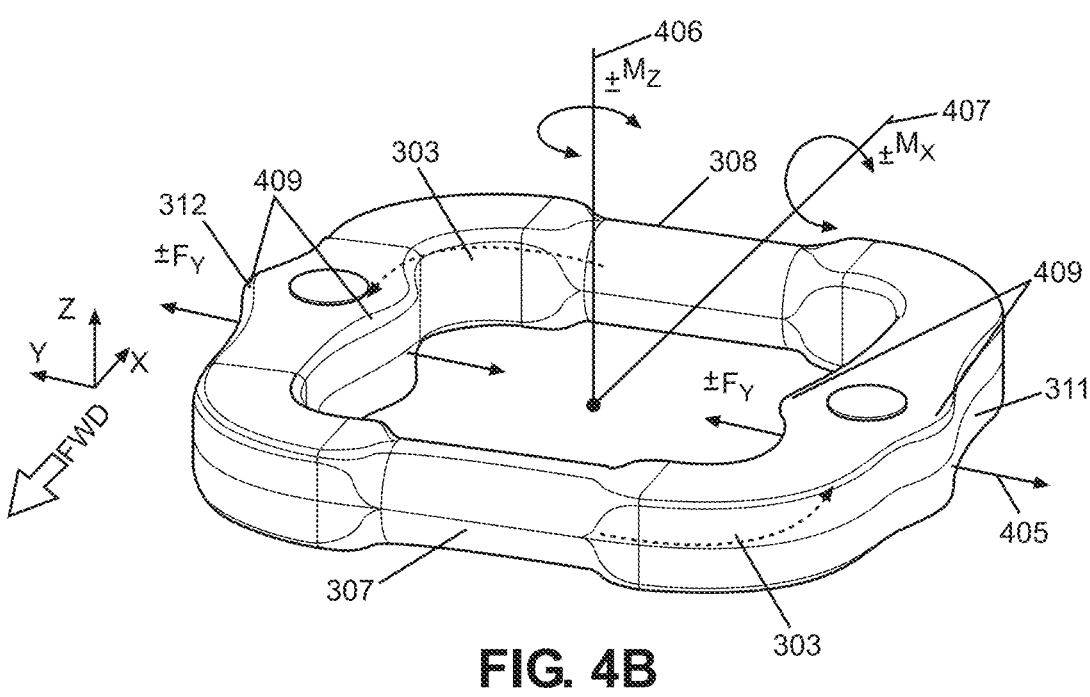
FIG. 4B is a perspective front view of a lateral y-force circuit exterior according to an embodiment of the invention.

FIG. 4B illustrates the contours of the lateral y-force circuit 400 including the horizontal archways 409 surrounding the vertical cylinders 401 and the elongate fan tunnels 315 surrounding the fans 302. Like the vertical z-force lift circuit 300, each structured segment serves as a means to guide airflow 303 in the intended direction.

The elongate fan tunnels 315 of the lateral y-force circuit 400 may be cylindrical air ducts 304 on the front and rear 307, 308 that surround the fans 302. The elongate fan tunnels 315 may direct airflow 303 along the front and rear 307, 308 and around corner portions of the lateral y-force circuit 400 toward each horizontal archway 409.

The horizontal archways 409 may be curved portions of the air ducts 404 extending horizontally from the first and second sides 311, 312 creating a horizontal bell curve swell around the vertical cylinders 401. Therefore, when viewing the aerial vehicle 100 from above as in FIG. 4A, the center point of each bell curve may correspond to a midpoint of the vertical cylinder 401 longitudinal axis. Additionally, the horizontal archways 409 may include tapered ends that align with the rest of their respective air ducts 404 running generally perpendicular to the longitudinal axes of the vertical cylinders 401. As shown, both positive and negative rotational moments 406, 407 may be generated at the horizontal archways 409 to enable the entire lateral y-force circuit 400 or portions thereof to move accordingly. Furthermore, as previously noted, one skilled in the art will appreciate that the elongate fan tunnels 315, fans 302 and air ducts 304 may be larger or smaller depending on need, preference, and circumstance.

Figures 5, 5A:
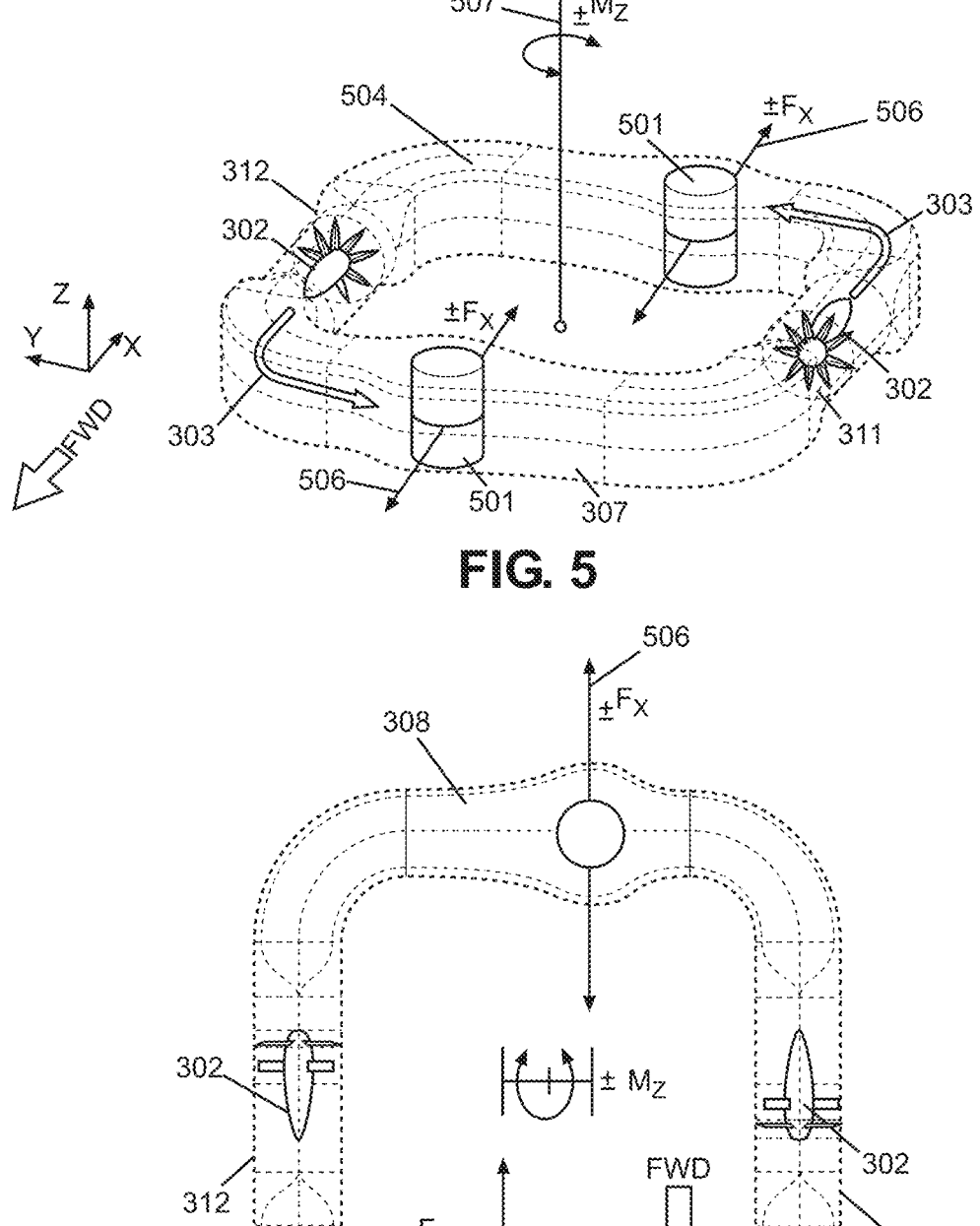
FIG. 5 is an interior perspective front view of a longitudinal x-force circuit according to an embodiment of the invention.
FIG. 5A is a top-down interior view of a longitudinal x-force circuit according to an embodiment of the invention.

FIG. 5 illustrates a segment of the aerial vehicle 100 defined as a longitudinal x-force circuit 500. Like the vertical z-force lift circuit 300 and the lateral y-force circuit 400, the longitudinal x-force circuit 500 may be an enclosed air duct 304 system. In some embodiments, the longitudinal x-force circuit 500 may be generally square or rectangular in shape and may align vertically with the vertical z-force lift circuit 300 and the lateral y-force circuit 400.

The longitudinal x-force circuit 500 may include a plurality of vertically oriented rotational cylinders 201, defined as vertical cylinders 501. The vertical cylinders 501 may be located within the air duct 504 system at opposing sides. As shown, one vertical cylinder 501 may be positioned within the front 307 of the longitudinal x-force circuit 500 and one vertical cylinder 501 may be positioned within the rear 308 of the longitudinal x-force circuit 500. Furthermore, the enclosed air duct 504 system may also include a plurality of fans 302 positioned on opposing sides adjacent the vertical cylinders 501. As shown, one fan 302 may be positioned within the first side 311 of the longitudinal x-force circuit 500 and one fan 302 may be positioned within the second side 312 of the longitudinal x-force circuit 500.

The fans 302 may generate airflow 303 through the air duct 504 and around the vertical cylinders 501. As depicted, airflow 303 is moving in a counter clockwise direction and circulating through the enclosed air duct 504 system and around the longitudinal x-force circuit 500. Depending on the direction each vertical cylinder 501 is being rotated, positive or negative longitudinal force 506, or thrust 506, may be generated causing that portion of the longitudinal x-force circuit 500 to move forward or backward. If working in unison, the entire longitudinal x-force circuit 500 may move in the x-direction. This circuit may provide the primary directional thrust 506, but also may hold the position of the aerial vehicle 100 in the presence of a head wind.

FIG. 5A shows a top-down view of the longitudinal x-force circuit 500 demonstrating that the vertical cylinders 501 may be asymmetrically offset from each other on the front and rear 307, 308 of the aerial vehicle 100. This may create a moment arm between the two force Fx vectors 506 and a rotational moment 507 about the z-axis. This may also enhance the spin or yaw control of the aerial vehicle 100.

Figure 5B:
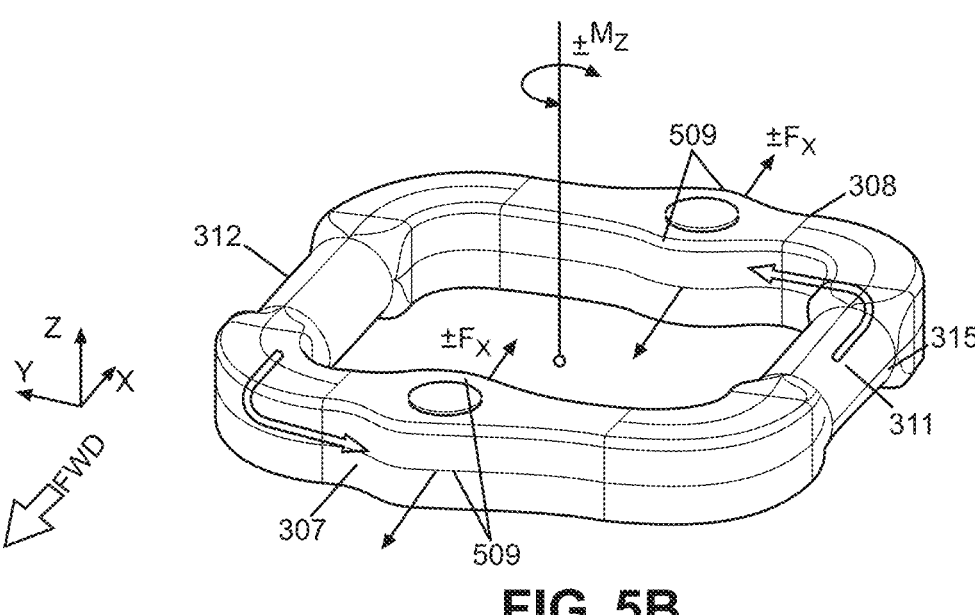
FIG. 5B is a perspective front view of a longitudinal x-force circuit according to an embodiment of the invention.

FIG. 5B illustrates the contours of the longitudinal x-force circuit 500 including the horizontal archways 509 surrounding the vertical cylinders 501 and the elongate fan tunnels 315 surrounding the fans 302. Like the vertical z-force lift circuit 300 and the lateral y-force circuit 400, each structured segment serves as a means to guide airflow 303 in the intended direction.

The elongate fan tunnels 315 of the longitudinal x-force circuit 500 may be cylindrical air ducts 304 on the first and second sides 311, 312 that surround the fans 302. The elongate fan tunnels 315 may direct airflow 303 along the first and second sides 311, 312 and around corner portions of the longitudinal x-force circuit 500 toward each horizontal archway 509.

The horizontal archways 509 may be curved portions of the air ducts 504 extending horizontally from the front and rear 307, 308 creating a horizontal bell curve swell around the vertical cylinders 501. Therefore, when viewing the aerial vehicle 100 from above as in FIG. 5A, the center point of each bell curve may correspond to a midpoint of the vertical cylinder 501 longitudinal axis. Additionally, the horizontal archways 509 may include tapered ends that align with the rest of their respective air ducts 504 running generally perpendicular to the longitudinal axes of the vertical cylinders 501. As shown, both positive and negative forces 506 may be generated at the horizontal archways 509 to enable the entire longitudinal x-force circuit 500 or portions thereof to move accordingly. Furthermore, as previously noted, one skilled in the art will appreciate that the elongate fan tunnels 315, fans 302 and air ducts 304 may be larger or smaller depending on need, preference, and circumstance.

Figure 6:
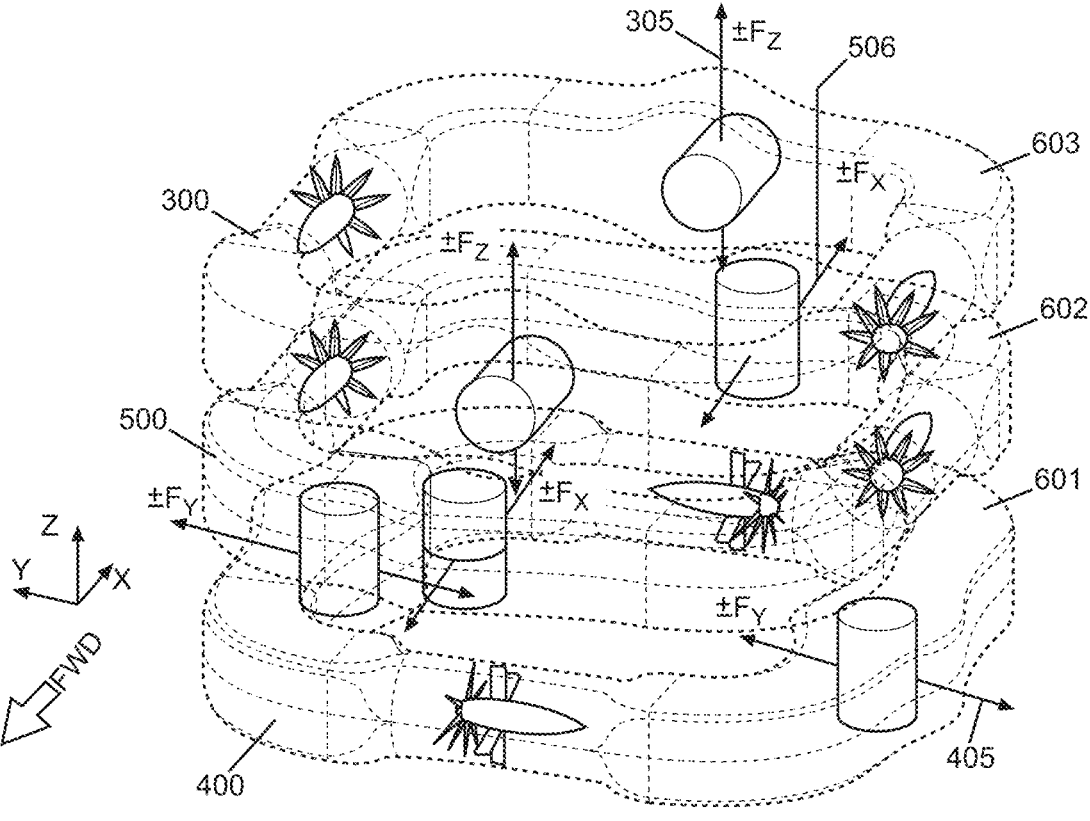
FIG. 6 is an interior perspective front view of a single cell UAV according to an embodiment of the invention.

FIG. 6 illustrates a single cell vehicle 101 with all three circuits 300, 400, 500 aligned vertically to optimize their performance. In particular, the bottom circuit 601 may be the lateral y-force circuit 400 providing lateral force 405 to the aerial vehicle 100. The middle circuit 602 may be the longitudinal x-force circuit 500 providing thrust force 506 to the aerial vehicle 100. Additionally, the top circuit 603 may be the vertical circuit 300 providing lift force 305 to the aerial vehicle 100. Combining all three circuits 300, 400, 500 creates an aerial vehicle 100 that is controlled in all directions and about all axes. Although depicted in a particular stacked order, one skilled in the art will appreciate that some variations of the circuit positioning may be apparent depending on need, circumstance and preference.

Figure 6A:
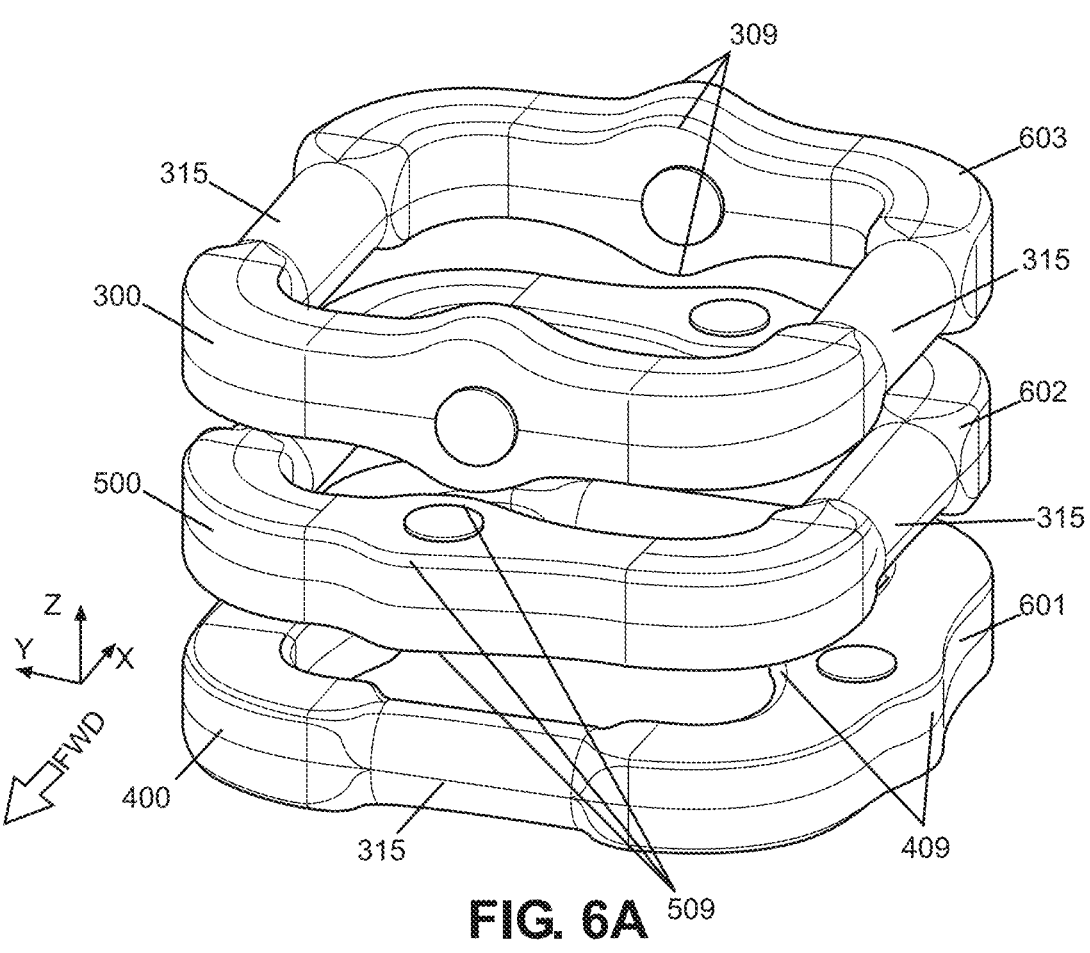
FIG. 6A is an exterior perspective front view of three circuits used within the single cell UAV according to an embodiment of the invention.

FIG. 6A emphasizes that the aerial vehicle 100 exterior does not reveal any hazardous components. The aerial vehicle 100 is able to operate without any external moving rotors or directed thrust to propel itself or hold its position in variable and unpredictable winds. Furthermore, the aerial vehicle 100 is able to maneuver close to structures and people to safely deliver packages without dangers from a propeller or burning fuel.

Figure 7:
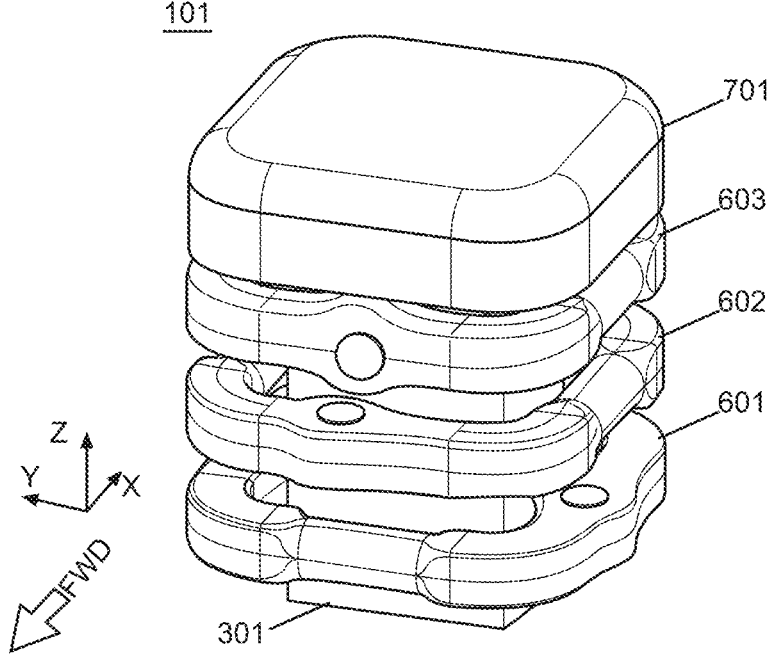
FIG. 7 is an exterior perspective front view of a single cell UAV with package according to an embodiment of the invention.

FIG. 7 illustrates that the single cell aerial vehicle 102 may include a control unit 701. The control unit 701 may be positioned atop the single cell aerial vehicle 102 just above the top circuit 603. In some embodiments, the control unit 701 may be a square cap with rounded edges enclosing electronic circuitry within. The control unit 701 may include a power source such as a battery, avionics, a processor, communication modules such as global positioning satellite (GPS), WiFi, near field communication, shortwave communication, gyro stabilizers, and supporting componentry such as antennas.

Figure 8:
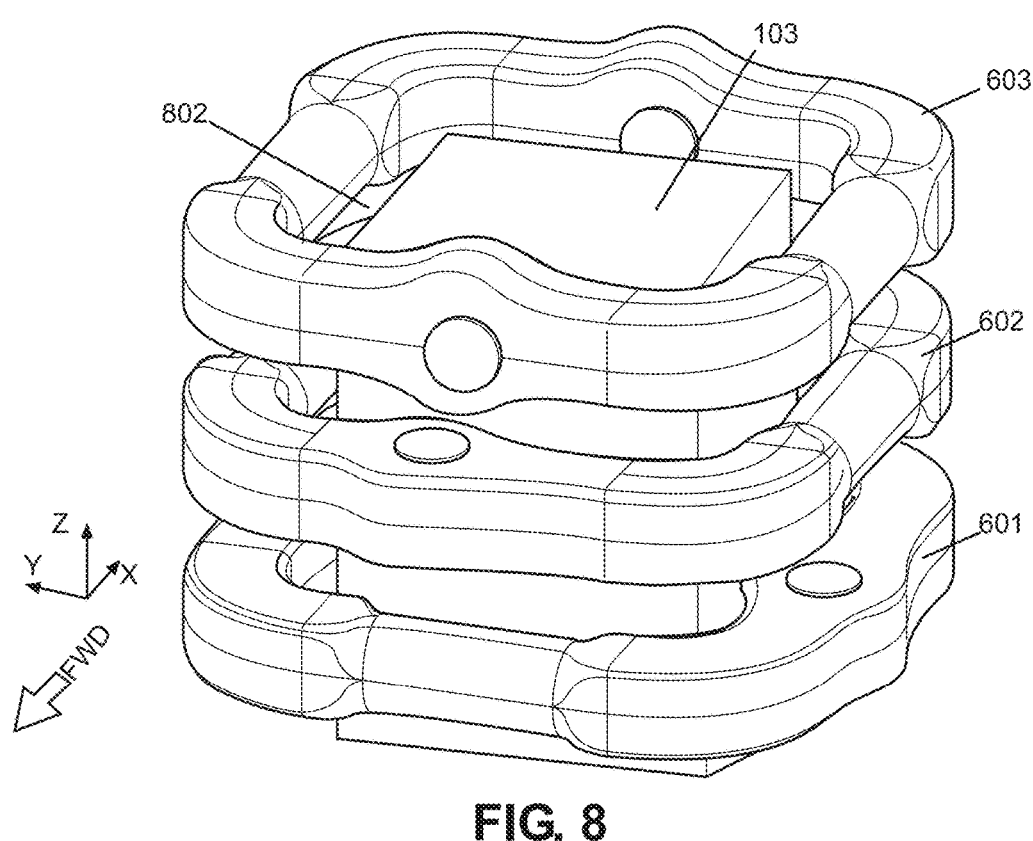
FIG. 8 is an exterior perspective front view of a single cell UAV with top removed and package according to an embodiment of the invention.

FIG. 8 demonstrates that the unique structure of the single cell vehicle 101 may allow for the transportation of an internal payload 103 such as a package within the internal void 802 created by the circumscribing circuits. As such, the bottom, middle and top circuits 601, 602, 603 in combination with the control unit 701 may create a protective barrier for safe transportation of the internal payload. Furthermore, because the bottom of the single cell vehicle 101 is not enclosed, the internal payload 102 may easily be dropped at a desired destination without the need for human interference.

Figure 9:
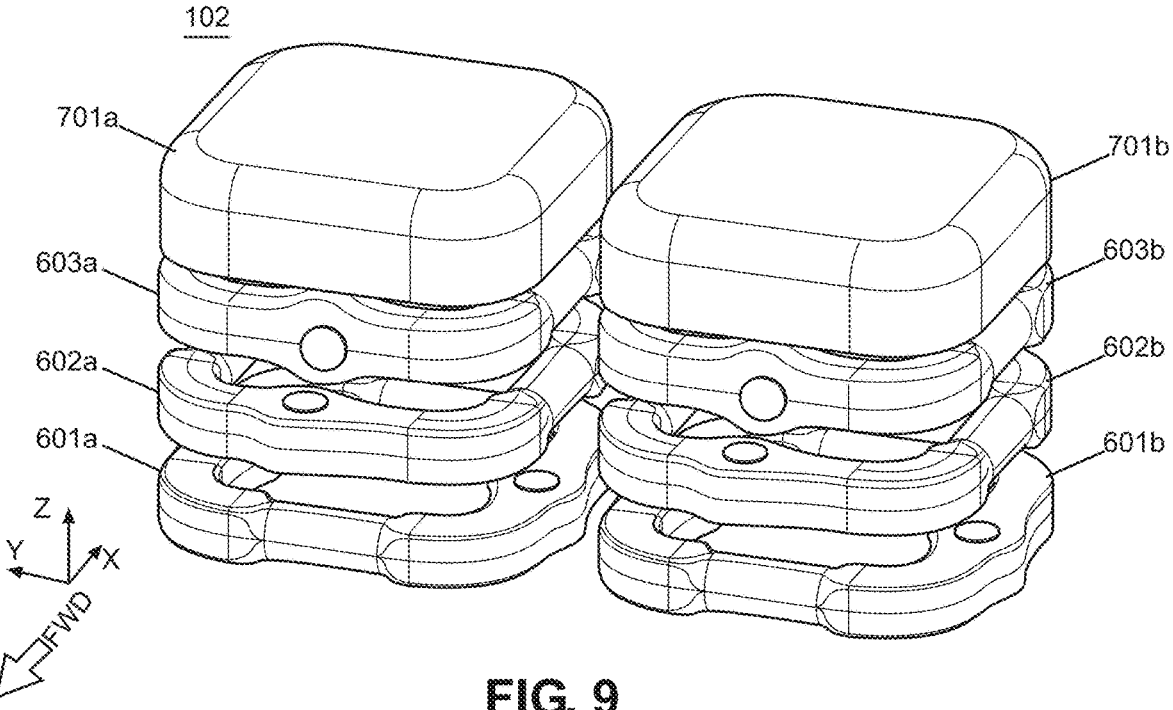
FIG. 9 is an exterior perspective front view of a double cell UAV according to an embodiment of the invention.

FIG. 9 illustrates an embodiment of the aerial vehicle 100 whereby two single cell vehicles 101 may be attached to form a double cell vehicle 102. In this embodiment, the double cell vehicle 102 may include first and second bottom circuits 601*a*, 601*b*, first and second middle circuits 602*a*, 602*b*, first and second top circuits 603*a*, 603*b*, and first and second control units 701*a*, 701*b*. In some embodiments, the two single cell vehicles 101 of the double cell vehicle 102 may be removably attached to each other. In other embodiments, they may be fixedly attached to each other. In any embodiment, the control units 701*a*, 701*b* may operate in tandem to control the aerial vehicle in its entirety. This may be by means of a master slave partnership whereby one control unit, for example 701*a* receives instructions and instantly relays that to the second control unit, 701*b*. Or, this may be by means of a true partnership whereby both control units 701*a*, 701*b* operate in unison simultaneously with the same set of instructions. In some embodiments one unit may operate independently in certain circumstances. By way of non-limiting example, one unit may hold its position while the other thrusts in order to make the entire unit spin.

Figure 9A:
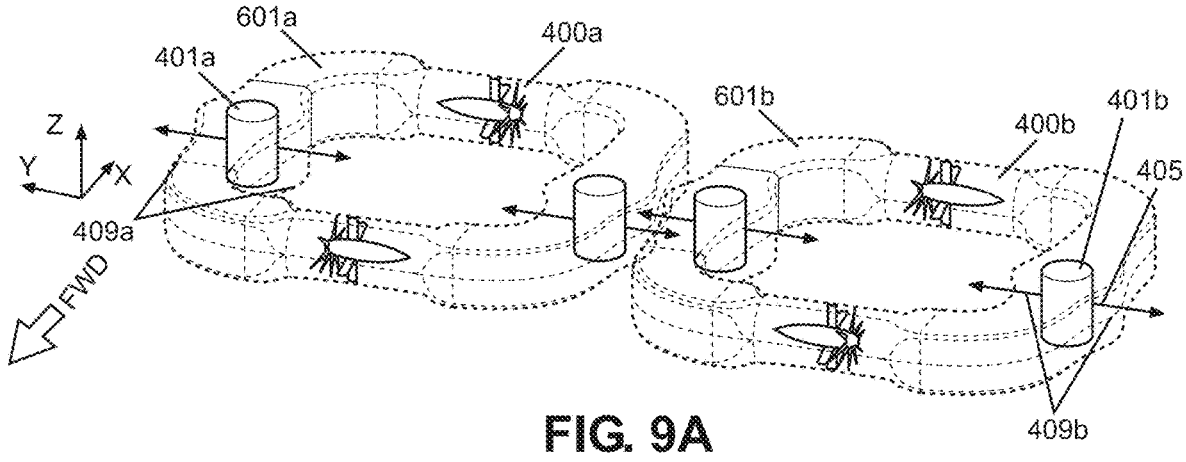
FIG. 9A is an interior perspective front view of the bottom two circuits of a double cell UAV according to an embodiment of the invention.
Figure 9B:
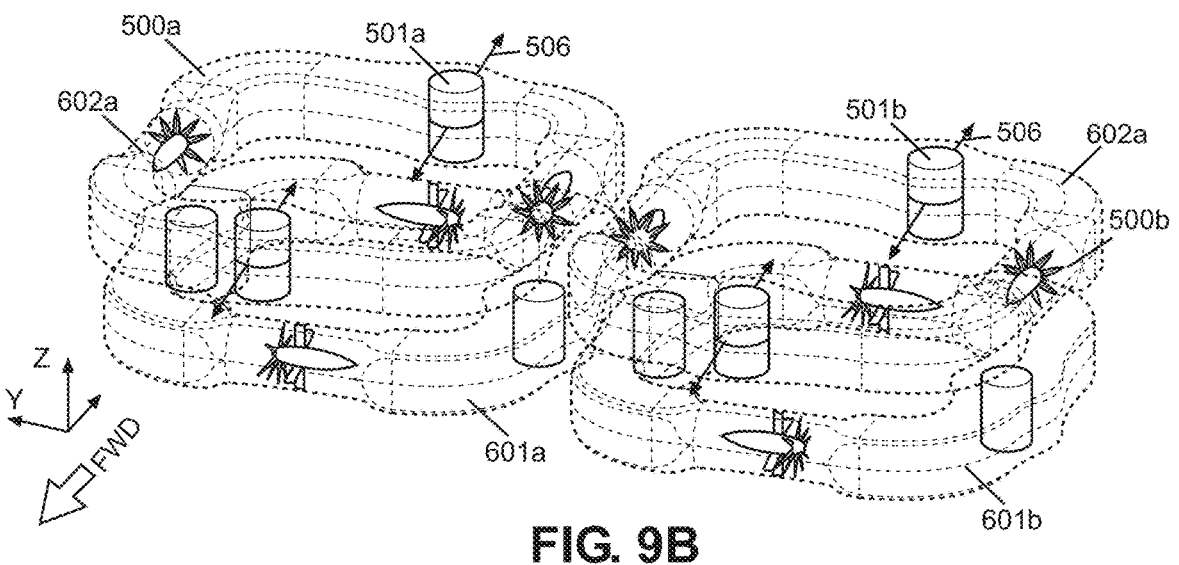
FIG. 9B is an interior perspective front view of the bottom two circuits and middle two circuits of a double cell UAV according to an embodiment of the invention.
Figure 9C:
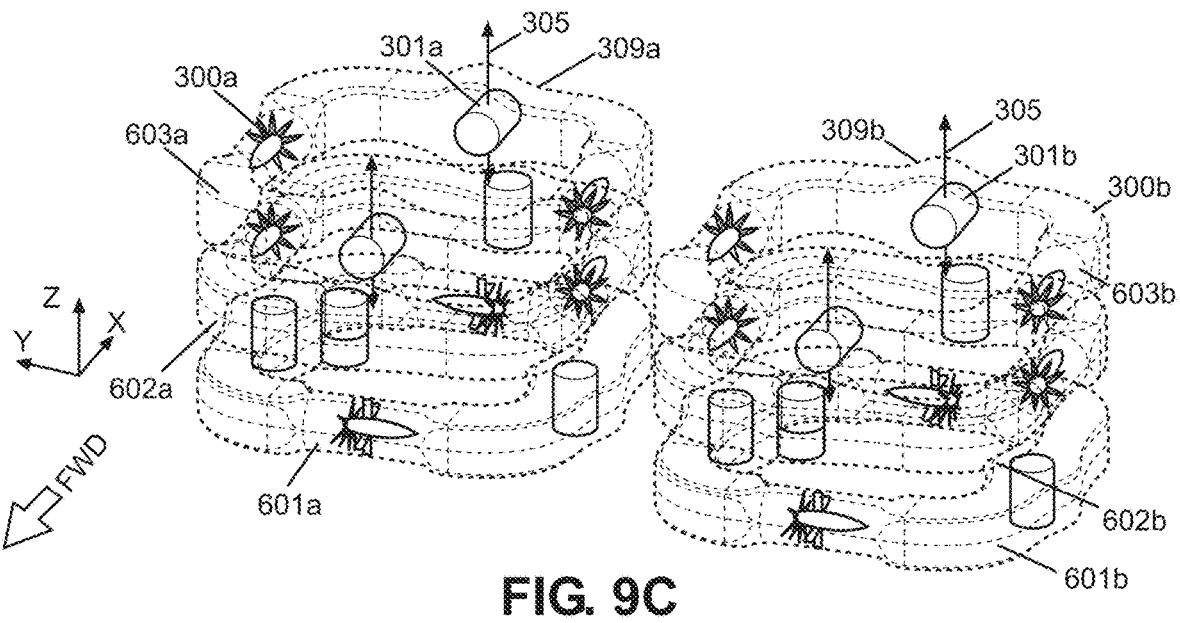
FIG. 9C is an interior perspective front view of the bottom two circuits, middle two circuits, and top two circuits of a double cell UAV according to an embodiment of the invention.

FIGS. 9A-9C show that the same structural logic for the single cell vehicle 101 may apply to the double cell vehicle 103. In particular, the bottom circuits 601*a*, 601*b* may be lateral y-force circuits 400 providing lateral force 405 to the double cell vehicle 102. The middle circuits 602*a*, 602*b* may be longitudinal x-force circuits 500 providing thrust force 506 to the double cell vehicle 102, and the top circuits 603*a*, 603*b* may be vertical circuits 300 providing lift force 305 to the double cell vehicle 102.

Although depicted in a particular stacked order, one skilled in the art will appreciate that some variations of the circuit positioning may be apparent depending on need, circumstance and preference. By way of non-limiting example, the bottom circuits 601*a*, 601*b* may be switched with the middle circuits 602*a*, 602*b*. In other embodiments, one circuit, for example 601*a*, may be switched with another level of circuit, for example 602*a*, to provide varied or unlevel flight patterns as in the case with an awkwardly shaped package or unevenly weighted package.

Figure 10:
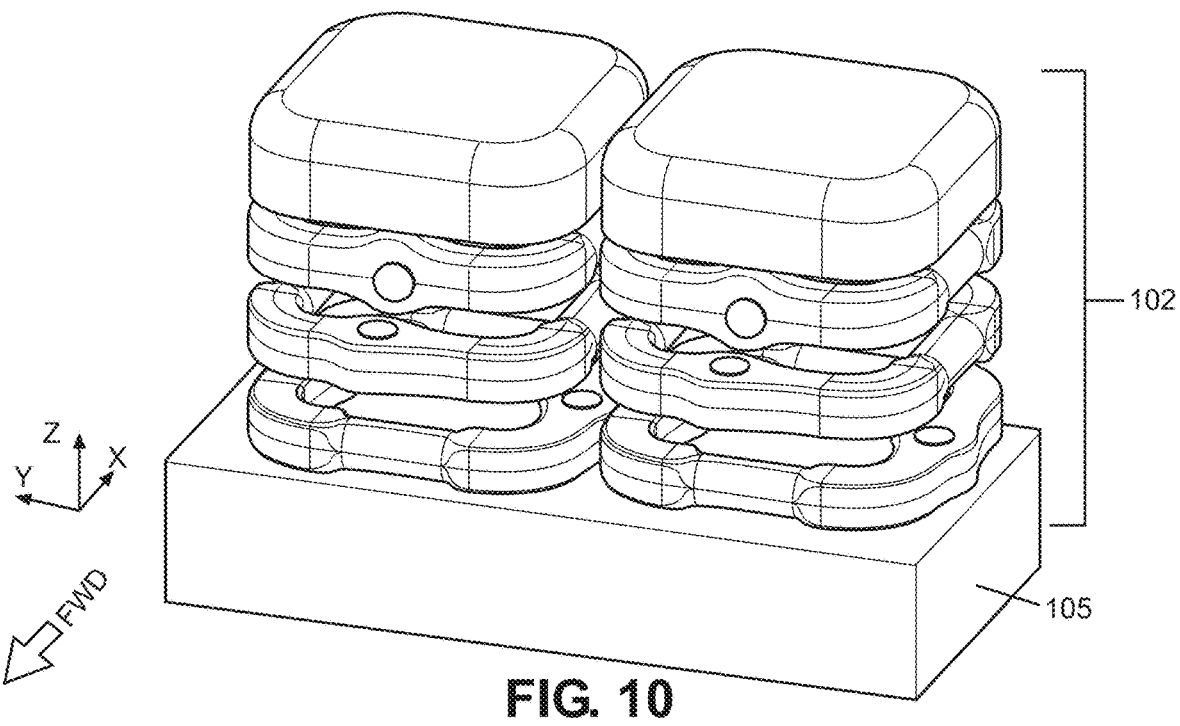
FIG. 10 is a perspective front view of a double cell UAV carrying an external payload according to an embodiment of the invention.

FIG. 10 illustrates the double cell vehicle 102 carrying an external payload 105 below the bottom circuits 601*a*, 601*b* as opposed to within the circuits as with the single cell vehicle 101. Because the double cell vehicle 102 may have twice the number of circuits and therefore twice the amount of potential force to propel itself compared to the single cell vehicle 102, the external payload 105 may be twice as large and/or twice as heavy. Furthermore, in some embodiments the double cell vehicle 102 may be equipped to carry three packages whereby two are carried within the internal bounds of the circuits and a third is carried below the bottom circuits 601*a*, 601*b*.

Figure 11:
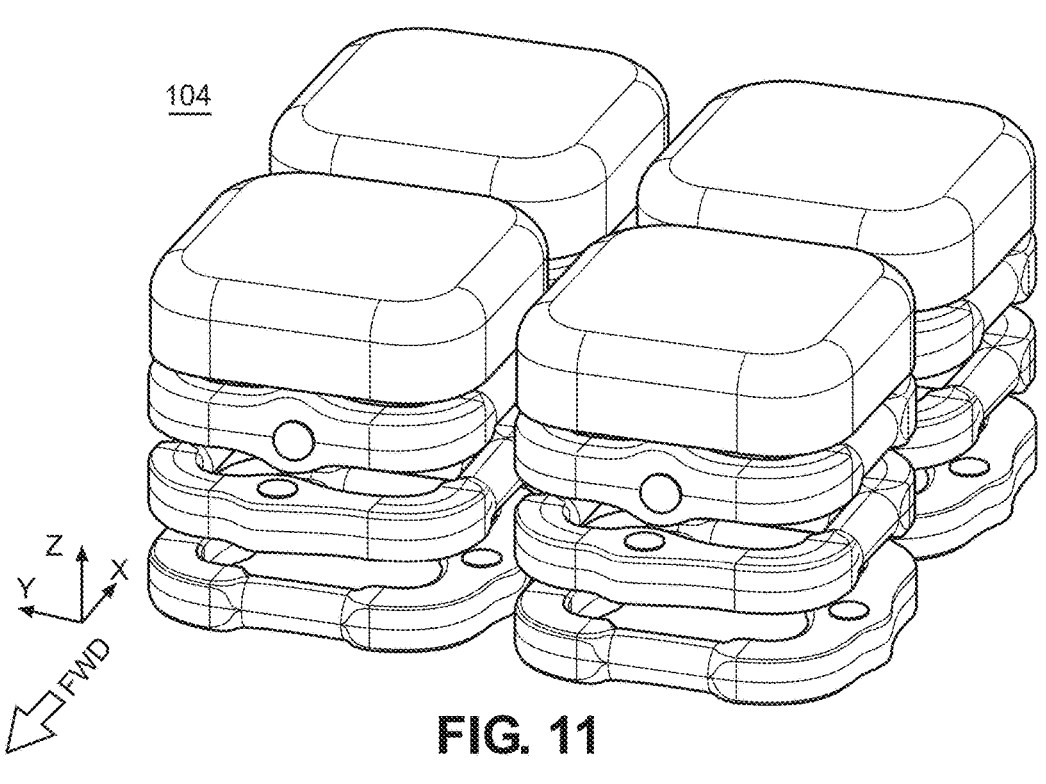
FIG. 11 is a perspective exterior front view of a quad cell UAV according to an embodiment of the invention.

FIG. 11 illustrates an embodiment of the aerial vehicle 100 whereby two double cell vehicles 102 may be attached to form a quad cell vehicle 104. In this embodiment, the quad cell vehicle 104 may include first, second, third, and fourth bottom circuits 601*a-d*, first, second, third, and fourth middle circuits 602*a-d*, first, second, third, and fourth top circuits 603*a-d*, and first, second, third, and fourth control units 701*a-d*. In some embodiments, the single cell vehicles 101 that make up the quad cell vehicle 104 may be removably attached to each other. In other embodiments, they may be fixedly attached to each other. In any embodiment, the control units 701*a-d* may operate in tandem to control the aerial vehicle in its entirety. This may be by means of a master slave partnership whereby one control unit, for example 701*a* receives instructions and instantly relays that to the other control units. Or, this may be by means of a true partnership whereby all control units 701*a-d* operate in unison simultaneously with the same set of instructions. In some embodiments one unit may operate independently in certain circumstances. By way of non-limiting example, one unit may hold its position while the others thrust in order to make the entire unit spin.

The same structural logic used for the double cell vehicle 102 may apply to a quad cell vehicle 104. In particular, the bottom circuits 601*a-d* may be lateral y-force circuits 400 providing lateral force 405 to the quad cell vehicle 104. The middle circuits 602*a-d* may be longitudinal x-force circuits 500 providing thrust force 506 to the double cell vehicle 102, and the top circuits 603*a-d* may be vertical circuits 300 providing lift force 305 to the quad cell vehicle 104.

Although depicted in a particular stacked order, one skilled in the art will appreciate that some variations of the circuit positioning may be apparent depending on need, circumstance and preference. By way of non-limiting example, the bottom circuits 601*a-d* may be switched with the middle circuits 602*a-d*. In other embodiments, one circuit, for example 601*a*, may be switched with another level of circuit, for example 602*a*, to provide varied or unlevel flight patterns as in the case with an awkwardly shaped package or unevenly weighted package.

Figure 11A:
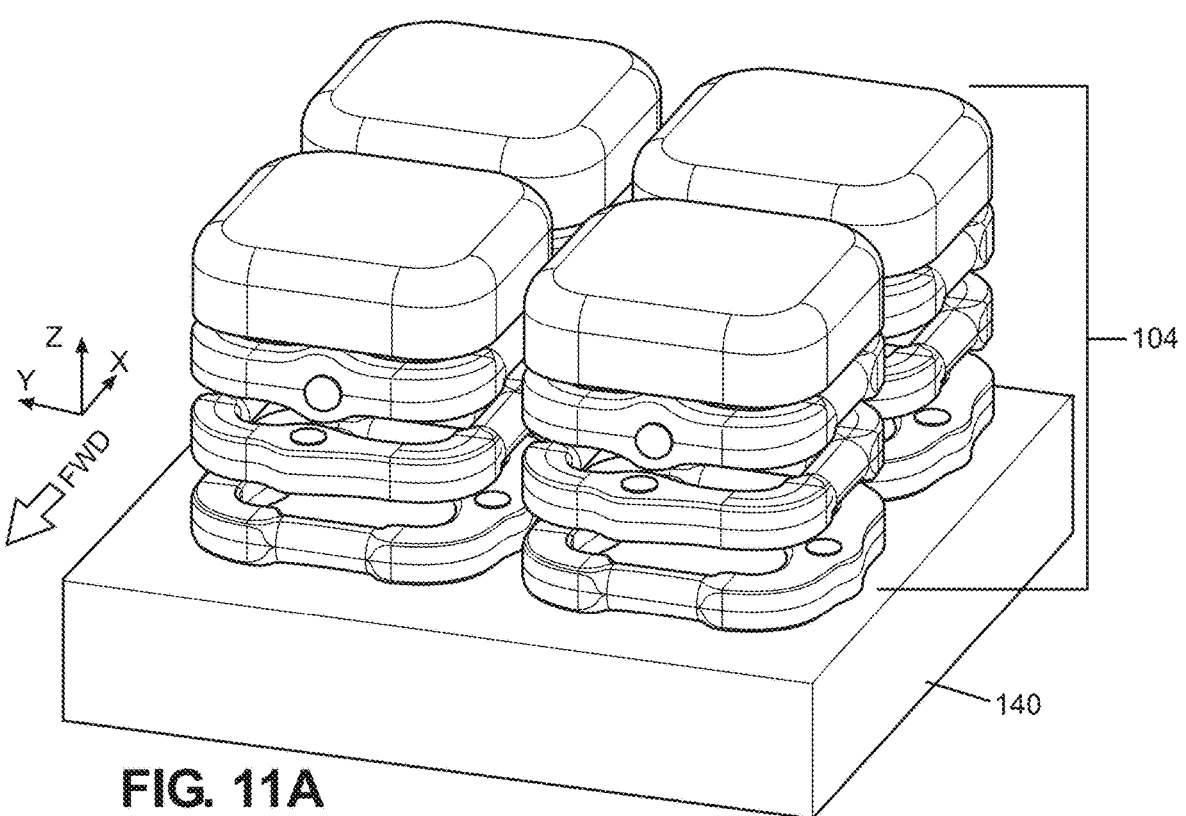
FIG. 11A is a perspective exterior front view of a quad cell UAV carrying an external payload according to an embodiment of the invention.

FIG. 11A illustrates the quad cell vehicle 104 carrying an external payload 105 below the bottom circuits 601*a-d* as opposed to within the circuits as with the single cell vehicle 101. Because the quad cell vehicle 104 may have twice the number of circuits as the double cell vehicle 102 and four times the number of circuits as the single cell vehicle 101, it may have twice the amount of potential force to propel itself compared to the double cell vehicle 102 and four times as much as the single cell vehicle 104. Therefore, it may carry an external payload 105 twice as large and/or twice as heavy as the double cell vehicle 102 and four times the size and/or weight of the single cell vehicle 101. Furthermore, as in the double cell vehicle 102, in some embodiments the quad cell vehicle 104 may be equipped to carry five packages whereby four are carried within the internal bounds of the circuits and a fifth is carried below the bottom circuits 601*a-d*.

FIG. 11B and FIG. 11C illustrate a component found in the circuit-based aerial vehicle according to an embodiment of the invention. As shown, the vertical and horizontal archways may include actuated louvered doors 1101 that may slidably engage a track along the ridges of the archway. These louvered doors 1101 may open, close, partially open and partially close to control venting the cylinder chamber 1105. The degree to which the louvered doors 1101 are vented may be based on spin rate of the cylinder 1104 and rate of air flow 303 through the duct. This may allow for a range of cylinder assemblies to meet noise and lifting performance requirements.

Figure 11D:
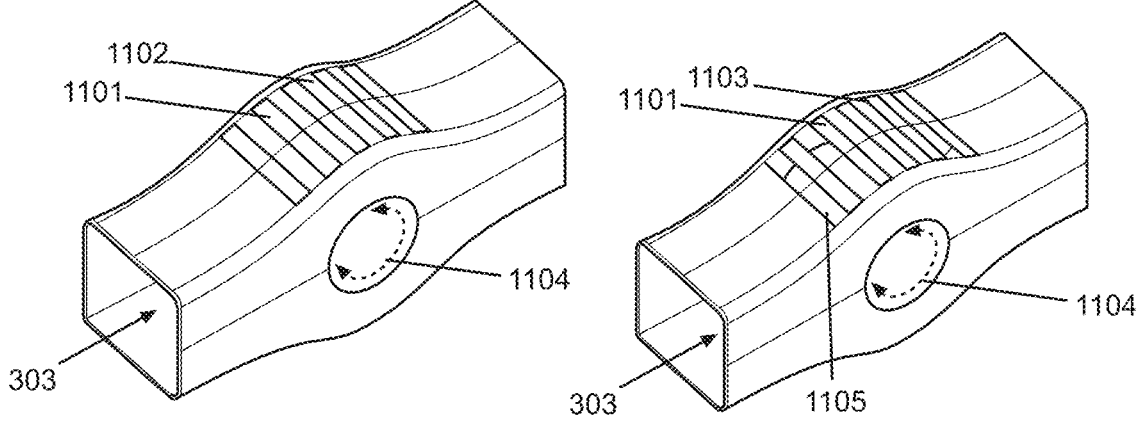
FIG. 11D is a perspective view of an individual component found in the circuit-based UAV according to an embodiment of the invention.
Figure 11D:
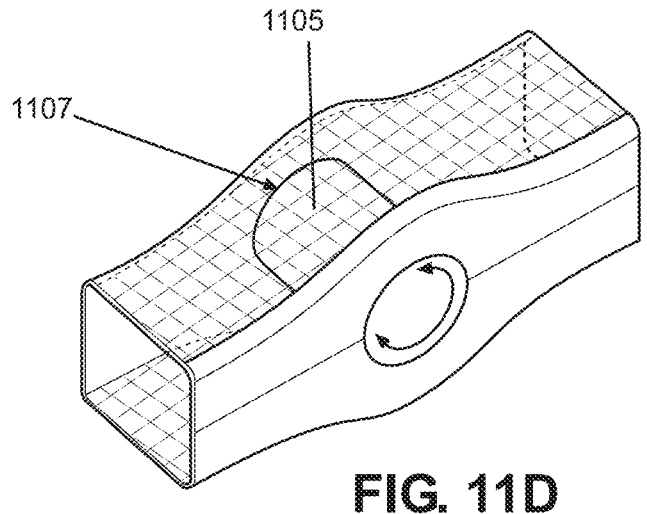

FIG. 11D illustrates an embodiment of the vertical and horizontal archways that may include a semi permeable surface or mesh 1107 along the curved surfaces. This semi permeable surface or mesh 1107 of the upper and lower cylinder chamber wall may be used to provide venting and to balance noise and lifting performance.

Figure 11E:
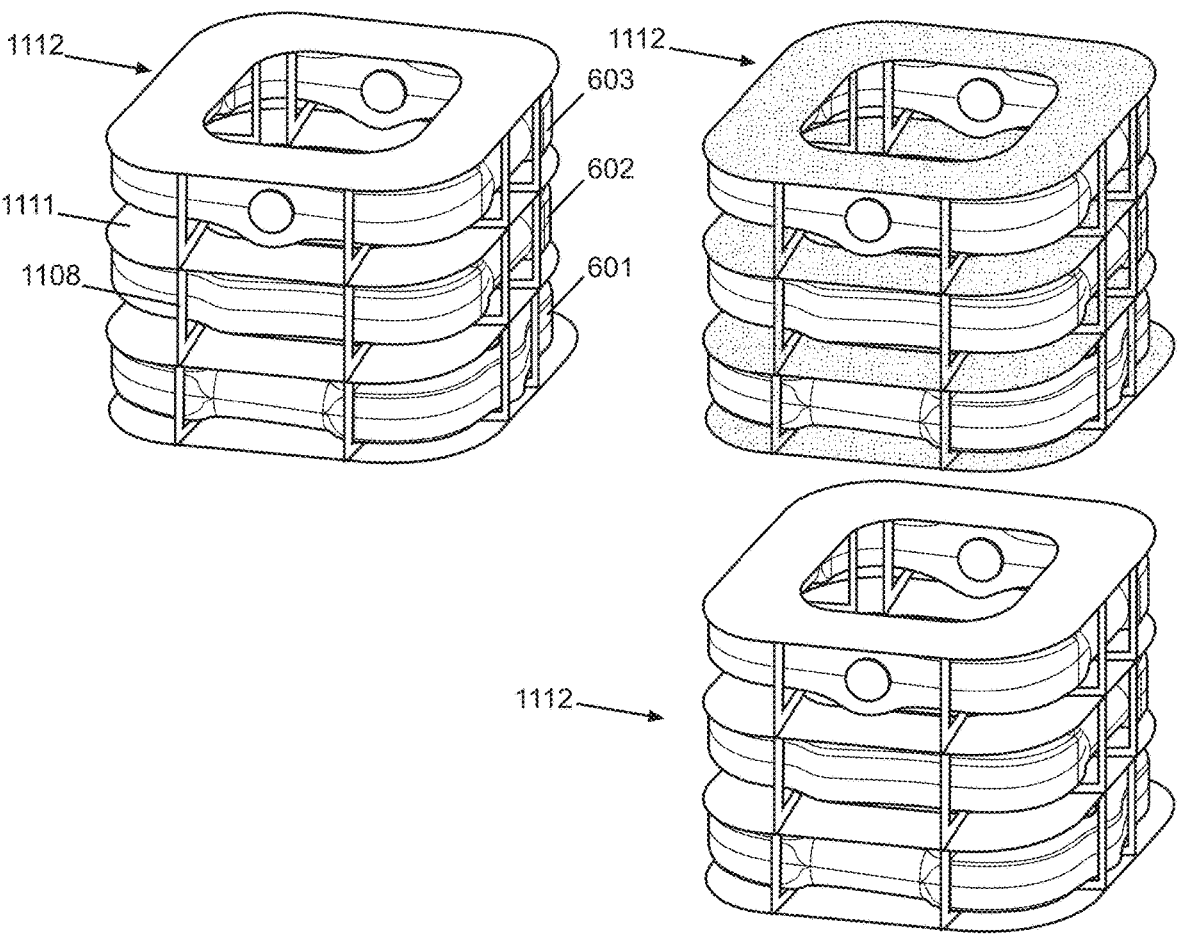
FIG. 11E are perspective views of a chassis in the circuit-based UAV according to an embodiment of the invention.

FIG. 11E shows structural framing 1112 including pillars 1108 and longerons 1111 that may be used to secure and stabilize the circuits 601, 602, 603. As shown, each circuit 601, 602, 603 may fit into its own level within the structural framing 1112 and each structural framing 1112 may attach to another structural framing unit 1112 to form a multi-celled unit.

Figure 12:
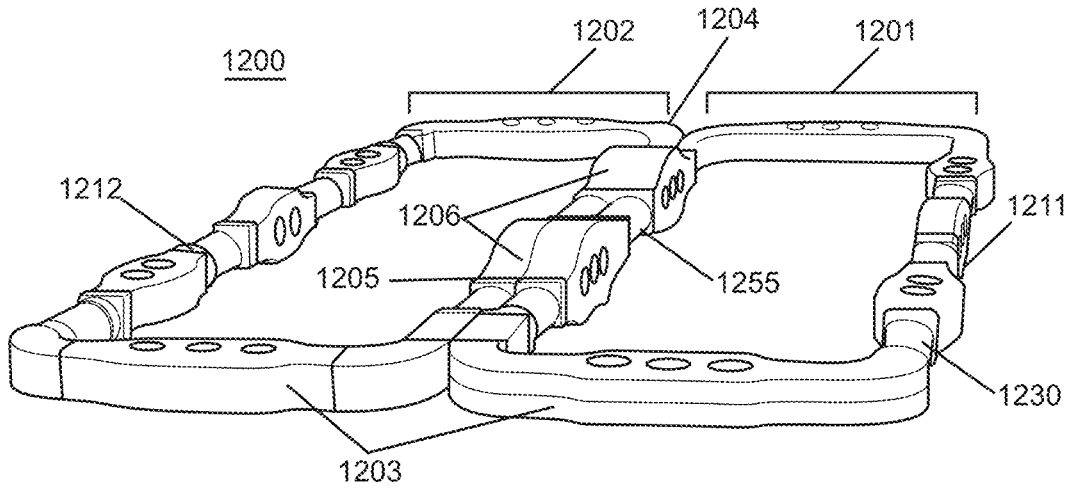
FIG. 12 is a perspective exterior front view of a circuit-based UAV according to another embodiment of the invention.

FIG. 12 illustrates another embodiment of the aerial vehicle 100 whereby a hybrid of two circuits, a first circuit 1201 and a second circuit 1202 may be used to form a double circuit vehicle 1200. The double circuit vehicle 1200 may include a first side 1211, a second side 1212, a front 1203 and a rear 1204. Between the two circuits may be a medial trunk 1205 with two vertical archways 1206. By way of non-limiting examples, scalable embodiments of the double circuit vehicle 1200 may include dollies, as well as a chassis for personal transport devices such as hover boards and vertical takeoff and landing (VTOL) vehicles.

Figure 13:
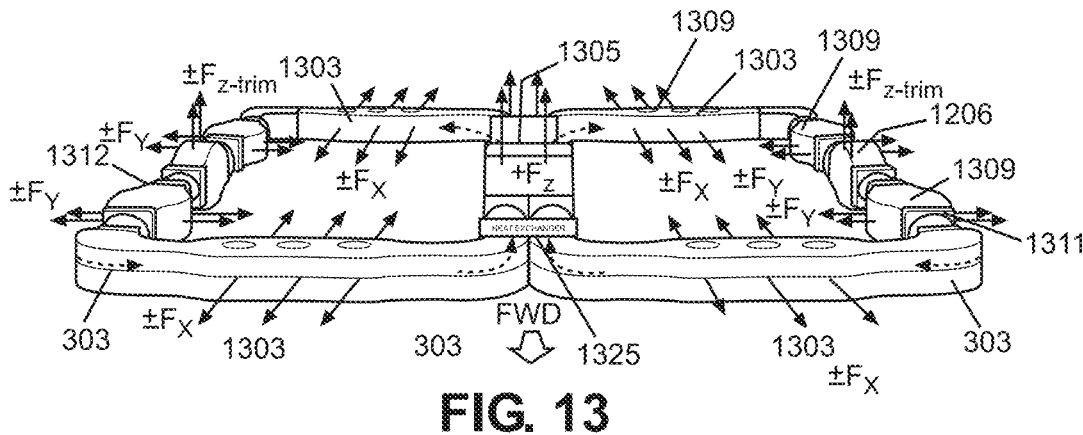
FIG. 13 is a perspective exterior front view of the circuit-based UAV illustrated in FIG. 12.

FIG. 13 shows that the double circuit vehicle 1200 may include a cross duct 1303 at the front 1203 and rear 1204 of the first circuit 1201 as well as a cross duct 1303 at the front 1203 and rear 1204 of the second circuit 1202. Furthermore, each cross duct 1303 may contain a horizontal archway 1309. At the converging point between two cross ducts 1303 proximate the front 1203 may be a heat exchanger 1325 to facilitate the dissipation of generated heat and cool the overall temperature of the double circuit vehicle 1200.

At the first side 1211 and second side 1212 may be a first and second arm duct 1311, 1312 respectively. The arm ducts 1311, 1312 may include two horizontal archways 1309, one proximate the front 1203 and one proximate the rear 1204. These archways may flank a medial vertical archway 1206. Furthermore, the medial trunk 1205 may include a medial duct 1305 extending from the front 1203 to the rear 1204. Before and after each archway on the medial duct 1305 may be twin duct tunnel assemblies 1255. Before and after each archway on the first and second arm ducts 1311, 1312 may be elongate fan ducts 1230.

The cross ducts 1303, medial duct 1305, and first arm duct 1311 may direct airflow 303 in a clockwise direction within the first circuit 1201. Likewise, the cross ducts 1303, medial duct 1305, and second arm duct 1312 may direct airflow 303 in a counter-clockwise direction within the second circuit 1202. However, one skilled in the art will appreciate that the double circuit vehicle 1200 may be structured to allow the direction of airflow 303 to be directed clockwise in the second circuit 1202 and counter-clockwise in the first circuit 1201 depending on need, circumstance and preference.

Figure 14:
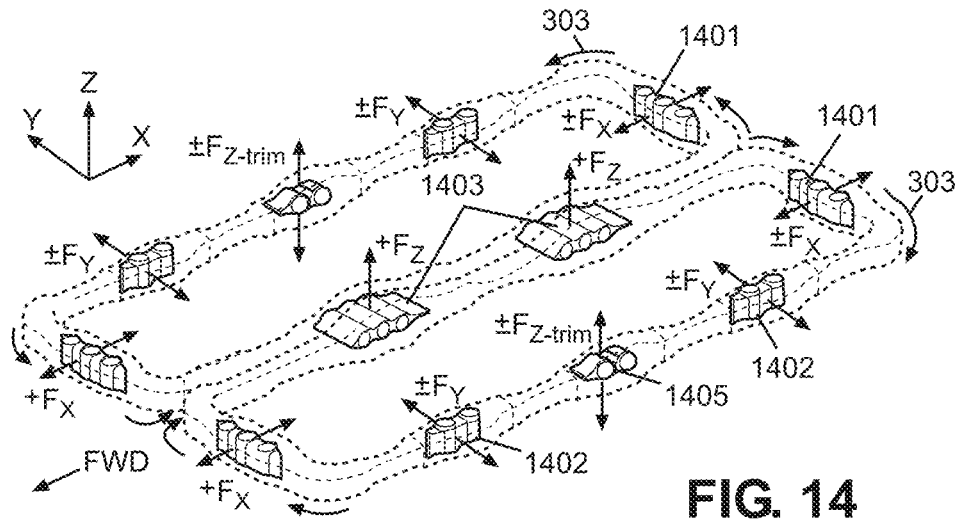
FIG. 14 is a top perspective view of the interior of the circuit-based UAV illustrated in FIG. 12.

FIG. 14 illustrates some internal componentry of the double circuit vehicle 1200. Similar to previous embodiments of the aerial vehicle 100, the double circuit vehicle 1200 includes vertically and horizontally oriented cylinders within archways. However, the cylinders may be in pairs or in triplicate and the archways, and ducts may be shaped, and expanded as a result to maximize airflow conditions over the rotating cylinders thereby optimizing the magnus force.

Within the horizontal archways 1309 of the first and second arm ducts 1311, 1312 may be pairs of vertical cylinders 1402. The pairs of vertical cylinders 1402 may be positioned so that their longitudinal axes are vertically oriented with respect to the aerial vehicle 100 yet parallel to each other. Furthermore, they may be in alignment with the longitudinal axes of the first and second arm ducts 1311, 1312, or in other words, aligned parallel to the x-axis of the double circuit vehicle 1200.

Additionally, the front 1203 and rear 1204 cross ducts 1303 may include triple vertical cylinders 1401. These may be positioned so that their longitudinal axes are parallel to each other but vertical with respect to the aerial vehicle 100 placing them generally aligned to the longitudinal axis of the front 1203 and rear 1204 cross ducts 1303.

Within the vertical archways 1206 of the first and second arm ducts 1311, 1312 may be pairs of horizontal cylinders 1405. The horizontal cylinders 1405 may be positioned so that their longitudinal axes are parallel to each other but horizontal with respect to the aerial vehicle 100 placing them generally perpendicular to the longitudinal axes of the first and second arm ducts 1311, 1312.

The medial duct 1305 may include triple horizontal cylinders 1403. These may be positioned so that their longitudinal axes are parallel to each other but horizontal with respect to the aerial vehicle 100 placing them generally perpendicular to the longitudinal axis of the medial duct 1305.

Figure 14A:
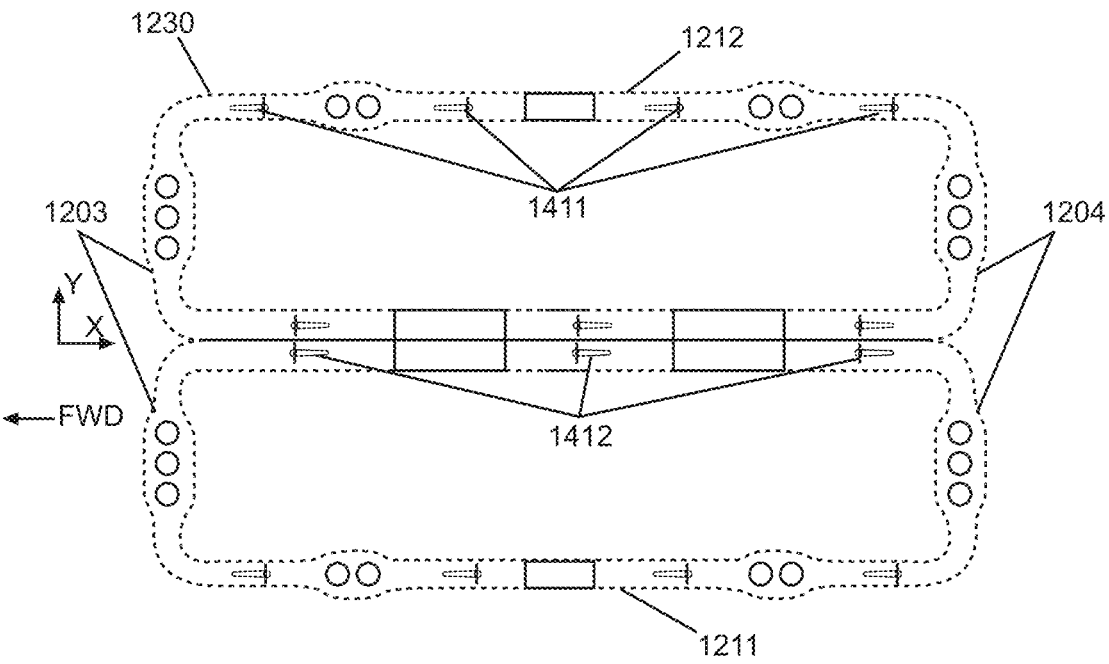
FIG. 14A is a top view of the interior of the circuit-based UAV illustrated in FIG. 12.

FIG. 14A illustrates placement of both single fans 1411 and dual fans 1412 within the double circuit vehicle 1200. As shown, the first and second ducts 1311, 1312 may include single fans 1411 on either side of the horizontal and vertical cylinders 1401, 1403. Each single fan 1411 may be surrounded by an elongate fan duct 1430. The single fan 1411 may be positioned to direct airflow 303 clockwise in the first circuit 1201 and counterclockwise in the second circuit 1202. This may include the single fans 1411 within the first arm duct 1311 to blow from the rear 1204 to the front 1203. Likewise, this may include the single fans 1411 within the second arm duct 1312 to blow from the rear 1203 to the front 1204.

Dual fans 1412 may be utilized within the medial duct 1305 at positions both before and after the triple horizontal cylinders 1403. Double fans 1412 may be two fans positioned side-by-side so that their airflow 303 is directed through the medial duct from front 1203 to rear 1204.

Figure 14B:
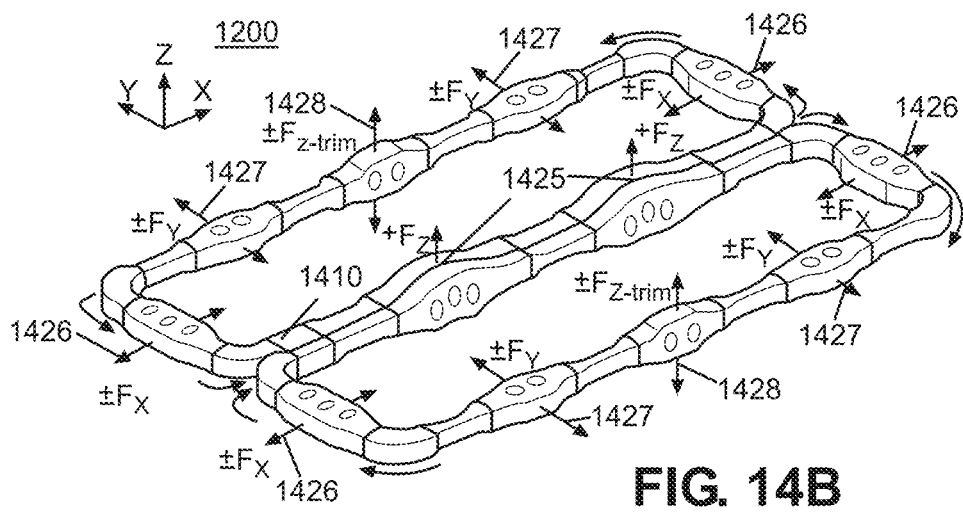
FIG. 14B is a perspective exterior front view of the circuit-based UAV illustrated in FIG. 12.

FIG. 14B illustrates the types of force generated upon the double circuit vehicle 1200 at various points. The main lift and pitch control 1425 may be generated at the vertical archways 1206 of the medial trunk 1205. Longitudinal thrust and yaw control 1426 may be generated at the horizontal archways 1309 both at the front 1203 and rear 1204. Lateral thrust and yaw control 1427 may be generated at the horizontal archways 1309 of the first and second sides 1211, 1212. Furthermore, trim lift and roll control 1428 may be generated at the vertical archways 1206 on the first and second sides 1211, 1212. The spin direction 202 of the cylinders 201 with respect to the directed airflow 303 determines whether the force acting upon the double circuit vehicle 1200 is positive or negative and therefore translates that portion of the double circuit vehicle 1200 accordingly.

Figure 15A:
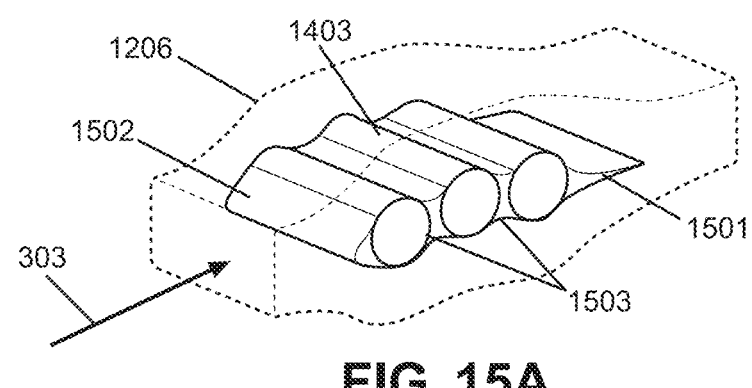
FIG. 15A is an interior side perspective view of a triple horizontal cylinder segment of the circuit-based UAV illustrated in FIG. 12.
Figure 15B:
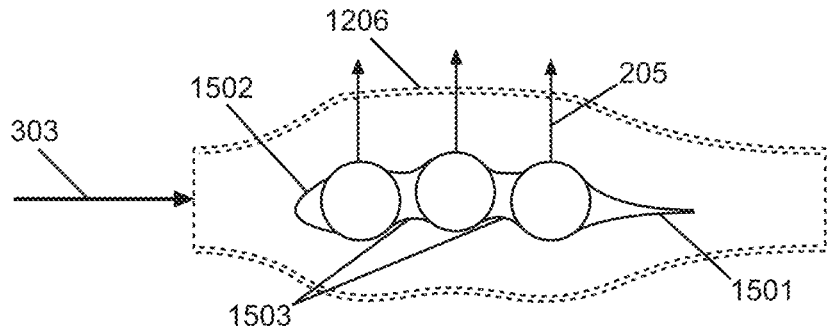
FIG. 15B is an interior side view of a triple horizontal cylinder segment of the circuit-based UAV illustrated in FIG. 12.

FIGS. 15A-B show a closer look at the triple horizontal cylinders 1403 of the double circuit vehicle 1200. In particular, FIG. 15A shows the triple horizontal cylinders 1403 surrounded by a vertical archway 1206. A closer look at the triple horizontal cylinders 1403 demonstrates that one end may include a cylinder ramp 1501, which may be a gradual taper between the top and bottom of the triple horizontal cylinders 1403 at that end. An opposing end of the triple horizontal cylinders 1403 may include a semi-oval end 1502. In between the horizontal cylinders 1403 may be airfoil bridge 1503, which may be arranged with the cylinder ramp 1501 to create a cambered hybrid magnus lift assembly that may greatly enhance lifting capability. As emphasized by FIG. 15B, only positive lift force 205 may be generated by the triple horizontal cylinders 1403. In fact, the structure of both triple horizontal cylinder units 1403 within the medial trunk 1205 optimizes them for unidirectional lifting of the double circuit vehicle 1200 and may support most of the payload weight and pitch control.

Figure 15C:
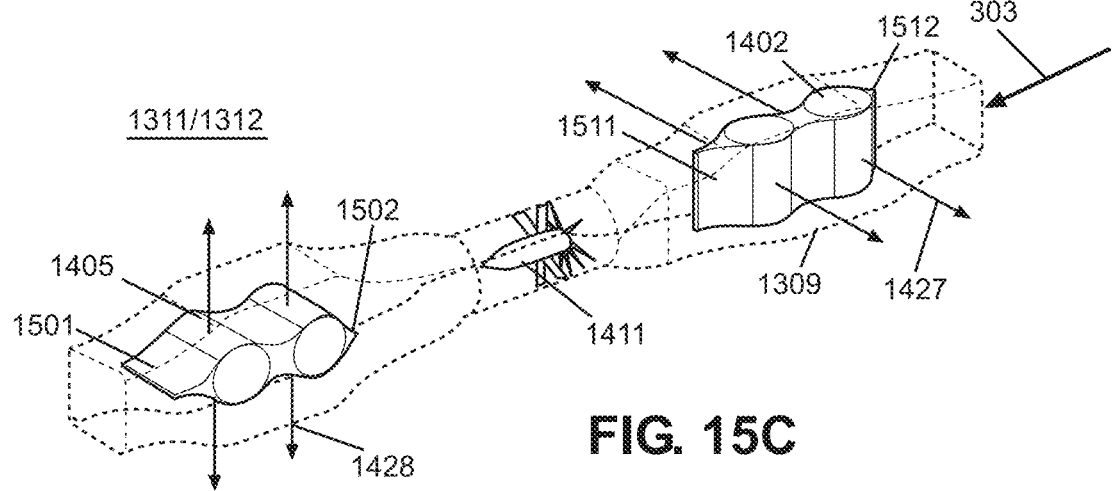
FIG. 15C is a perspective side view of a segment of one side of the circuit-based UAV illustrated in FIG. 12.
Figure 15D:
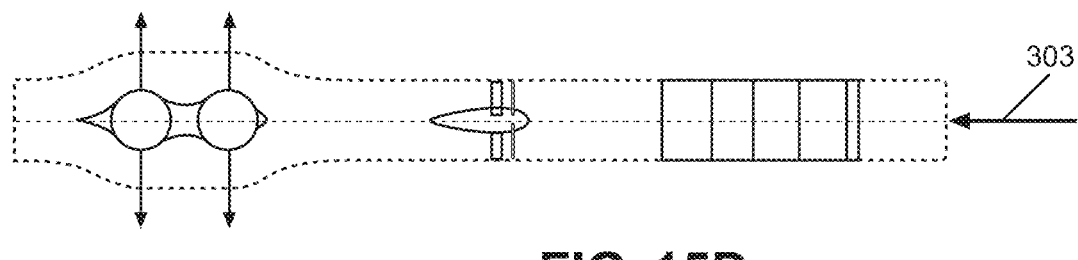
FIG. 15D is a side view of a segment of one side of the circuit-based UAV illustrated in FIG. 12.

FIGS. 15C-D show a closer look at a segment of the arm ducts 1311, 1312 demonstrating the unique structure of a pair of horizontal cylinders 1405 and a pair of vertical cylinders 1402 separated by a single fan 1411. The single fan 1411 may add airflow 303 momentum to maintain a uniform flow field for the downstream cylinders.

Similar to the triple horizontal cylinders 1405, the pair of horizontal cylinders 1405 may include a cylinder ramp 1501 at one end, an opposing semi-oval end 1502 at another, and an airfoil bridge 1503 in between. The horizontal cylinders 1405 are enclosed by a vertical archway 1206 and may provide trim lift and roll control 1428.

The pair of vertical cylinders 1402 may include a sideways cylinder ramp 1511, a sideways semi-oval end 1512, and a sideways airfoil bridge 1513. The sideways cylinder ramp 1511 may taper from one side of the pair of vertical cylinders 1402 to another side. A horizontal archway 1309 may enclose the entire pair of vertical cylinders 1402, which may provide bidirectional force for lateral movement, balancing and yaw control.

FIG. 15E and FIG. 15F illustrate a component found in the circuit-based aerial vehicle according to an embodiment of the invention. As shown, the vertical and horizontal archways may include actuated louvered doors 1551 that may slidably engage a track along the ridges of the archway. These louvered doors 1551 may open, close, partially open and partially close to control venting the cylinder chamber 1403. The degree to which the louvered doors 1551 are vented may be based on spin rate of the cylinder 1104 and rate of air flow 303 through the duct. This may allow for a range of cylinder assemblies to meet noise and lifting performance requirements.

FIG. 15G illustrates an embodiment of the vertical and horizontal archways that may include a semi permeable surface or mesh 1557 along the curved surfaces. This semi permeable surface or mesh 1557 of the upper and lower cylinder chamber wall may be used to provide venting and to balance noise and lifting performance.

Figures 16A, 16C, 16E:
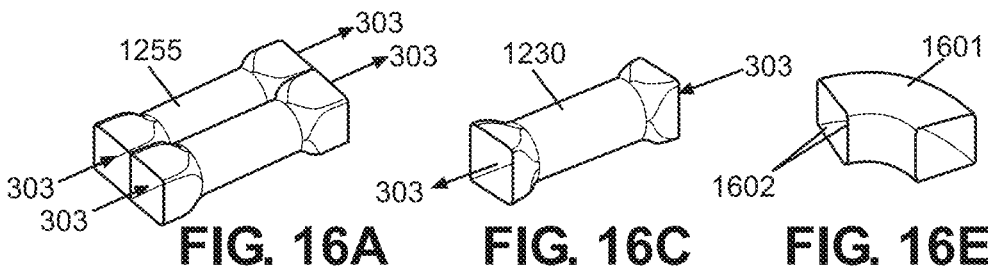
FIG. 16A is a perspective view of individual componentry found in the circuit-based UAV illustrated in FIG. 12.
FIG. 16C is perspective and side views of an individual componentry found in the circuit-based UAV illustrated in FIG. 12.
FIG. 16E is a perspective view of individual componentry found in the circuit-based UAV illustrated in FIG. 12.
Figures 16B, 16D, 16F:
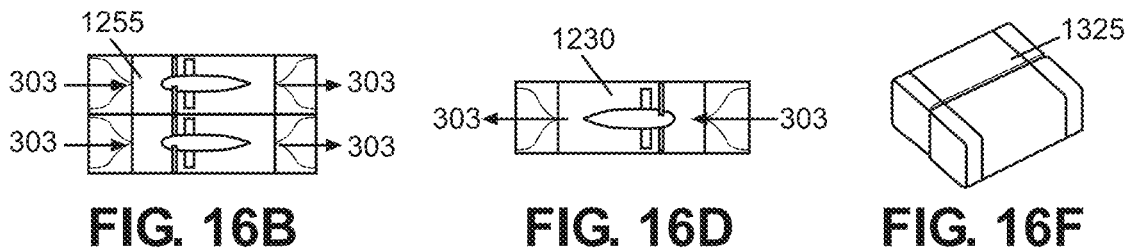
FIG. 16B is a side view of individual componentry found in the circuit-based UAV illustrated in FIG. 12.
FIG. 16D is a side view of individual componentry found in the circuit-based UAV illustrated in FIG. 12.
FIG. 16F is a perspective view of individual componentry found in the circuit-based UAV illustrated in FIG. 12.
Figures 16G, 16I:
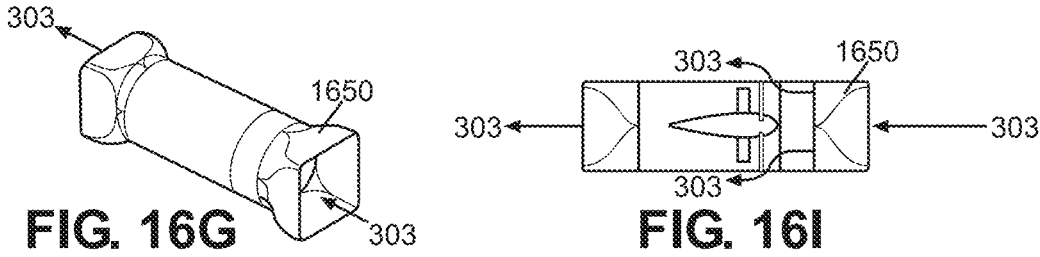
FIG. 16G is a perspective view of individual componentry found in the circuit-based UAV illustrated in FIG. 12.
FIG. 16I is a side view of individual componentry found in the circuit-based UAV illustrated in FIG. 12.
Figures 16H, 16J:
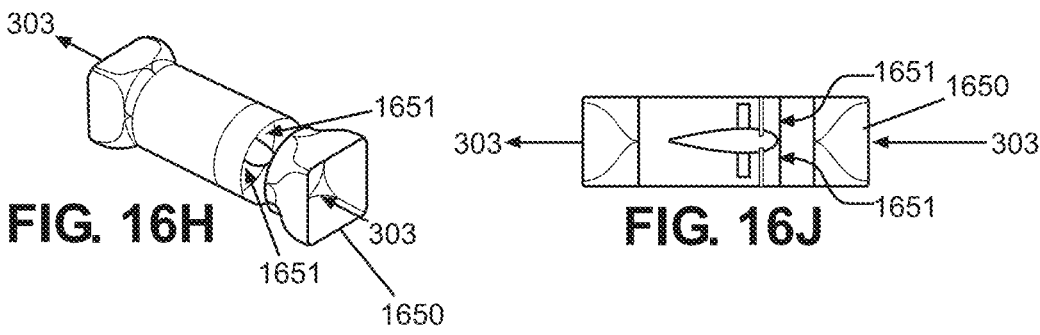
FIG. 16H is a perspective view of individual componentry found in the circuit-based UAV illustrated in FIG. 12.
FIG. 16J is a side view of individual componentry found in the circuit-based UAV illustrated in FIG. 12.

FIGS. 16A-16J highlight componentry that may be found within the double circuit vehicle. In particular, 16A illustrates a twin duct tunnel assembly 1255 that may be found within the medial trunk 1205. There may be three of these components making up three portions of the medial duct 1305. As shown by FIG. 16B, each twin duct tunnel assembly 1255 may house dual fans 1412 therein and may assist with directing airflow 303 from the front 1203 to the rear 1204.

FIG. 16C shows an elongate fan duct 1430 which may be positioned on the first and second arm ducts 1311, 1312 before and after each archway 1309, 1206. As shown by FIG. 16D, each elongate fan duct 1230 may house a single fan 1411 therein and may assist with directing airflow 303 from one end of the double circuit vehicle 1200 to the other. In some embodiments they may be placed within the cross ducts 1303 to remove distorted flow field effects induced by upstream components.

FIG. 16E illustrates a corner duct 1601 that may assist with directing airflow 303 around 90-degree turns within the ducts of the double circuit vehicle 1200. In some embodiments, the corner ducts 1601 may be curved to facilitate airflow 303 rounding a corner seamlessly. The corner ducts 1601 may contain hollow turning vanes 1602 that may serve as heat exchangers 1325. Additionally, in some embodiments, screens may be employed at either end of the corner ducts 1601 to break up turbulence and create a uniform airflow 303.

FIG. 16F shows a heat exchanger 1325 that may be positioned proximate the front 1203 of the medial trunk 1205. The heat exchanger 1325 may remove and offset thermal energy introduced into the air circuit by the fans 1411, 1412 thereby lowering circuit air temperature and density to increase the efficiency of the lift force 1425.

FIG. 16G-16J illustrate the structure and functionality of a slidable air vent 1650 that may be at the end of one or more elongate fan ducts 1230. As shown, the slidable air vent 1650 may be removably attached to the medial cylindrical portion of the elongate fan duct 1430. This may allow for external air 1651 to flow into the elongate fan duct 1430 in some instances as in FIGS. 16H and 16J. It may also allow airflow 303 from within the double circuit vehicle 1200 to escape to the external environment, as in FIG. 16I. In some embodiments the slidable air vent 1650 may be translated away from the cylindrical portion of the elongate fan ducts 1230 when needed. By way of non-limiting example, if the double circuit vehicle 1200 needed to cool quickly, it may open to allow for hot air to escape the circuit. In other examples, the slidable air vent 1650 may allow for air to enter or exit depending on the type of force that needs to be created. In some instances, the vehicle may need to generate additional thrust force 1401 by allowing exhaust to exit. In this case, the control unit 701 may signal the slidable air vent 1650 to open and allow for air to escape.

The slidable air vents 1650 may stabilize the double circuit vehicle 1200 along all axes by achieving an optimal balance between duct airflow speed and the spin rate of all of the cylinders. Airflow conditions (pressure, velocity, temperature) may vary throughout the first and second circuits 1201, 1202 requiring localized venting to avoid flow reversal or stalls. The slidable air vents 1650 may allow airflow 303 to enter or exit to pneumatically rebalance the air pressure, temperature, and velocity throughout the respective circuit 1201, 1202.

FIGS. 16K-16N further emphasize the structure and positioning of the cylinders and arm ducts 1311, 1312 outlined in FIGS. 15C-D. Each may impact the type of force generated on the double circuit vehicle 1200 allowing it to transport and maneuver in all directions. However, in these embodiments, the duct walls may be removed. In order to improve lifting performance, the top and bottom walls of the ducts housing the cylinders may be removed. This may establish channeled flow where the ends of the cylinders are capped while the airflow 303 is free to expand radially around the cylinders.

FIGS. 16M-16N illustrate that the top and bottom walls may also be permeable to allow moderate radial freedom of the airflow 303 while limiting noise. The degree of wall permeability may be driven by optimization of noise and lifting performance to meet the requirements of the double circuit vehicle 1200.

Figure 17A:
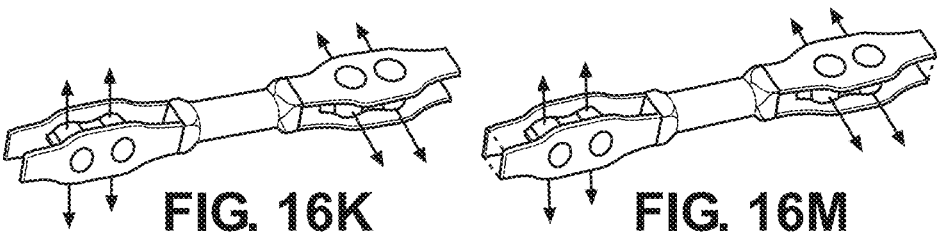
FIG. 17A is a side view of the circuit-based UAV illustrated in FIG. 12.
Figure 17A:
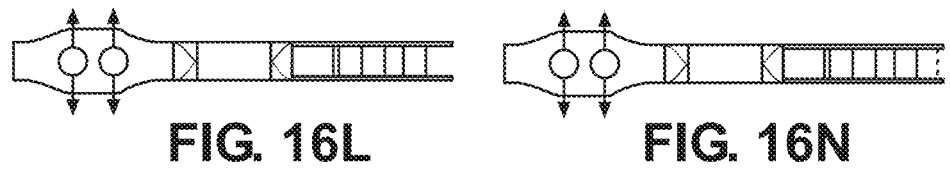
Figure 17A:
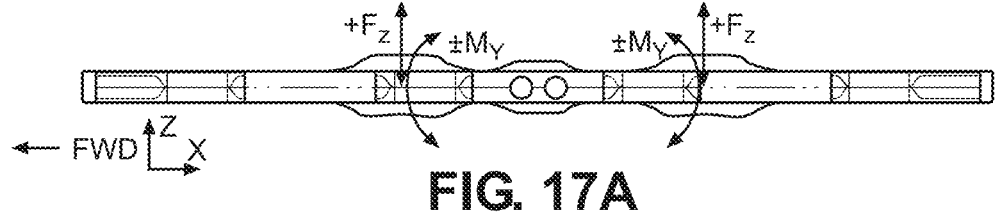
Figure 17B:
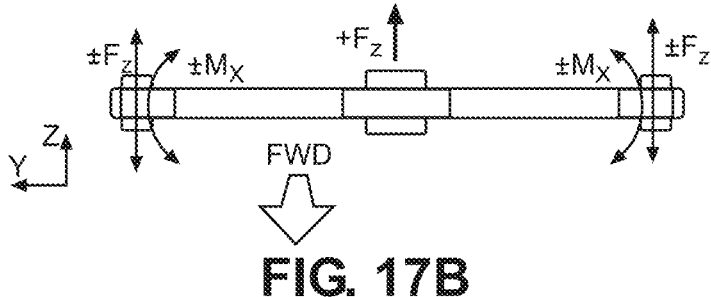
FIG. 17B is a front view of the circuit-based UAV illustrated in FIG. 12.

FIGS. 17A-17B further emphasizes that the double circuit vehicle 1200 utilizes the spinning cylinder assemblies in a ducted airflow 303 to generate forces and moments for control. The cylinder assemblies may be programmed to account for the inertial masses of the double circuit vehicle 1200 to stabilize it during hover or flight.

As illustrated, the medial duct 1305 may contain two main lifting cylinder assemblies 1403 that generate the bulk of the vehicle lift $F_Z$ 1425 and are unidirectional force generators. The forward and aft units can vary the cylinder rotational speeds and lift force $F_Z$ independently to create a pitch moment, $M_Y$.

Figure 18:
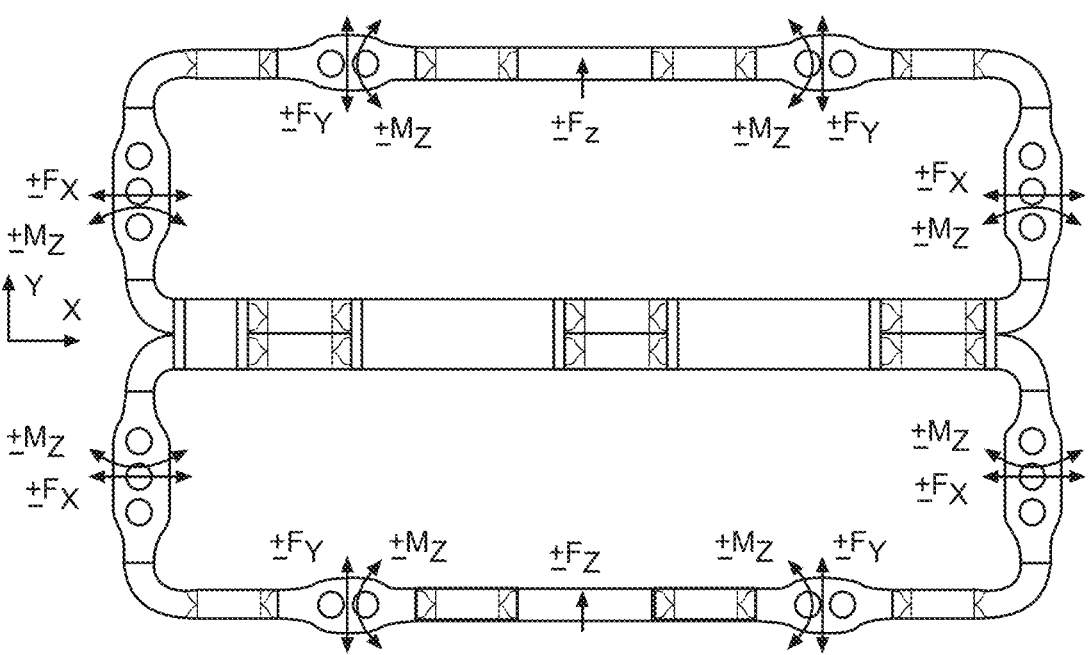
FIG. 18 is a top view of the circuit-based UAV illustrated in FIG. 12.

FIG. 18 illustrates that the double circuit vehicle 1200 may rotate its pitch from front 1203 to rear 1204 and vice versa as well as create lift. Likewise, it may rotate from its first side 1211 to second side 1212 and vice versa. Additionally, the double circuit vehicle 1200 may spin depending on the rotation direction 202 of each individual cylinder 201 within the pairs of horizontal and vertical cylinders 1405, 1402 and triple horizontal cylinders 1401.

Moreover, the two bidirectional lateral force cylinder assemblies of the first and second arm ducts 1311, 1312 may generate side propulsion FY to allow lateral movement 1427 or steady the vehicle against lateral winds. The four units in the first and second arm ducts 1311, 1312 may also create a moment MZ about the z-axis for yaw control. These units may also provide additional roll control if the center of gravity is located above the double circuit vehicle 1200.

As previously mentioned, the four cross ducts 1303 may each contain bidirectional longitudinal force cylinder assemblies to generate forward and aft propulsion FX. These units may also contribute moments MZ about the z-axis, providing additional yaw control. These units may also provide additional pitch control if the center of gravity is located above the double circuit vehicle 1200 or if the CG is not aligned with the center of lift between the vertical forces FZ 1425 created by lifting cylinder assembles 1425.

Figure 19A:
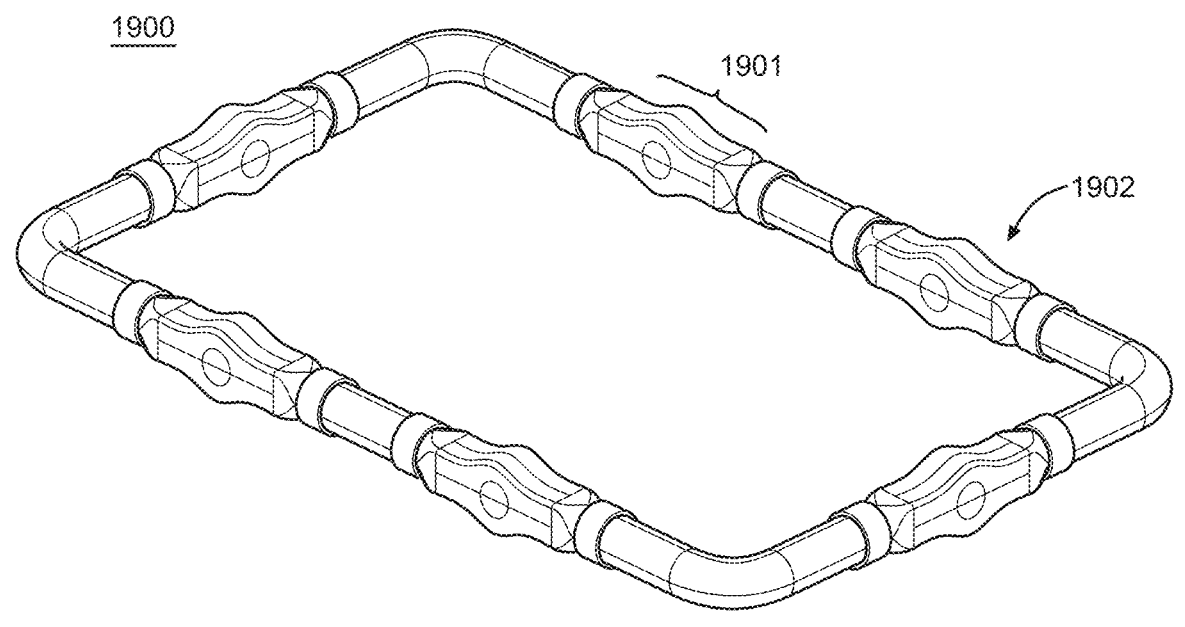
FIG. 19A is a perspective view of a circuit-based vehicle according to another embodiment of the invention.

FIG. 19A is a perspective view of a circuit-based vehicle 1900 according to another embodiment of the invention. In this embodiment, a rotating archway assembly 1901 is structured to orient the rotational cylinders 201 in differing positions in order to provide a variety of directional force for navigation. In this embodiment, the aerial vehicle 100 may be a single enclosed air duct circuit 1902. The enclosed air duct circuit 1902 may include a plurality of fans 302 within respective fan tunnels 315 and a plurality of rotating archway assemblies 1901. The respective rotational cylinders 201 are structured to provide directional force to the circuit-based vehicle 100 when airflow 303 generated by the plurality of fans 302 passes over the rotational cylinders 201 while rotating.

Figure 19B:
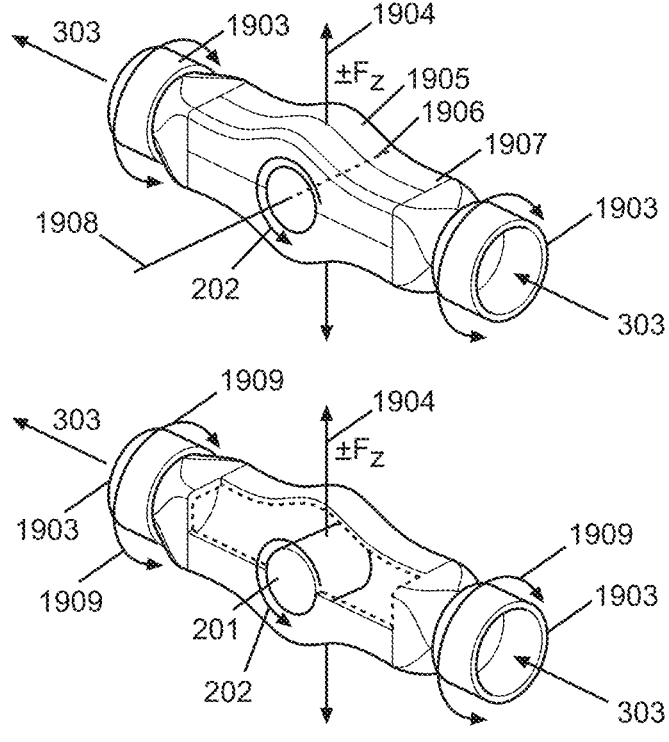
FIG. 19B are perspective views of componentry found in the circuit-based vehicle illustrated in FIG. 19A.

Referring additionally to FIG. 19B, more in-depth views of the rotating archway assemblies 1901 are illustrated. As shown, the rotating archway assemblies 1901 include medial archways 1905 as bell curve swells of respective cylinder casing 1907 positioned at opposing surfaces of the cylinder casing 1907. Actuating collars 1903 are positioned at opposing ends of the cylinder casing 1907 with the rotational cylinder 201 within the cylinder casing 1907 rotatable along its longitudinal axis 1906. The highest point of the bell curve swell corresponds to a midpoint of the rotational cylinder longitudinal axis. The actuating collars 1903 may be structured to spin 1909 their respective cylinder casings 1907 along the cylinder casing axes thereby orienting the rotational cylinders 201 in different positions along their medial axes.

Therefore, when the actuating collars 1903 are actuated by a control unit, they rotate 1909. Since the actuating collars 1903 are fixedly attached to the cylinder casings 1907, the cylinder casings 1907 themselves rotate thereby rotating the entire rotating archway assembly 1901. In other words, the respective rotational cylinders 201 are attached to their respective cylinder casings 1907 at opposing ends of the rotational cylinders 201 in a manner to keep their positioning fixed within the cylinder casings 1907 while allowing them to rotate along their own longitudinal axes.

Because the rotational cylinder 201 is fixedly attached to the sides of the cylinder casing 1907 at opposing ends of the rotational cylinder 201, when the cylinder casing 1907 is rotated, the orientation of the rotational cylinder 201 is changed. The rotational cylinder 201 is still able to spin 202 with provided airflow 303 from the ducts to deliver lift force 1904. Other directional force is also able to be delivered including negative lift, spin, and thrust depending on the orientation of the rotational cylinders 201 along their medial axes relative to airflow 303 and the horizontal plane of the rest of the aerial vehicle 100.

Figure 20A:
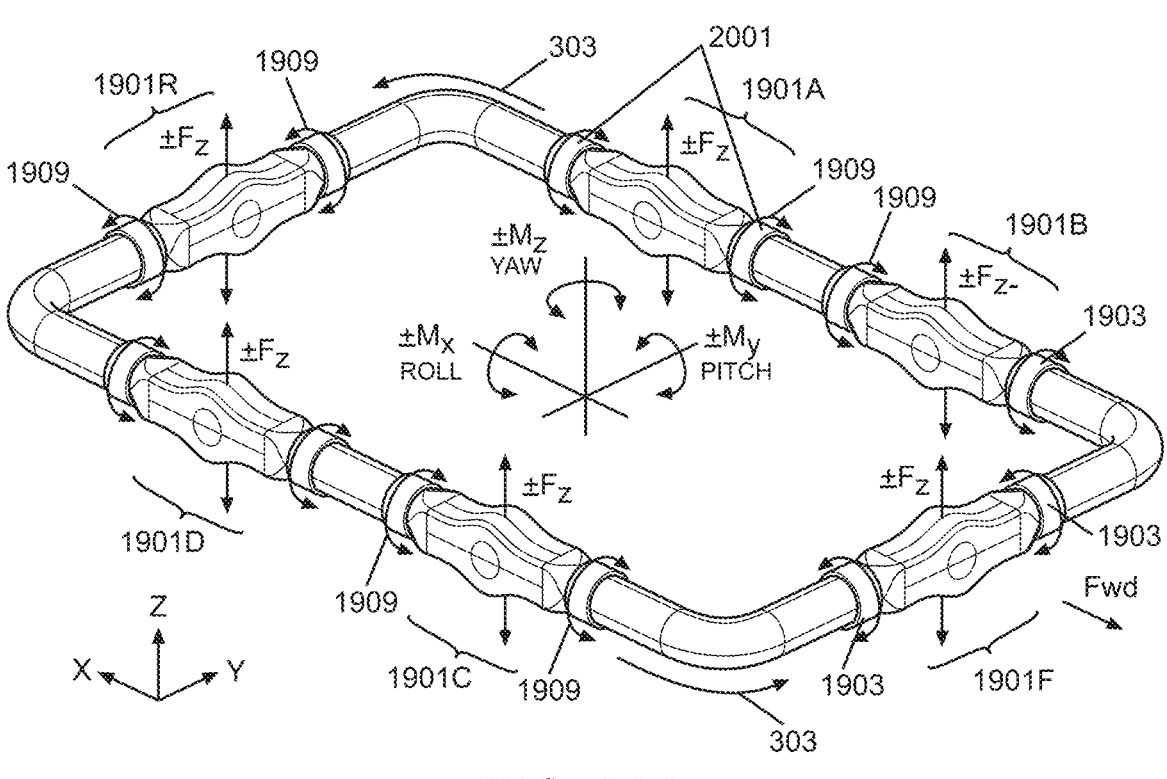
FIG. 20A is a perspective view of the circuit-based vehicle illustrated in FIG. 19A.
Figure 20B:
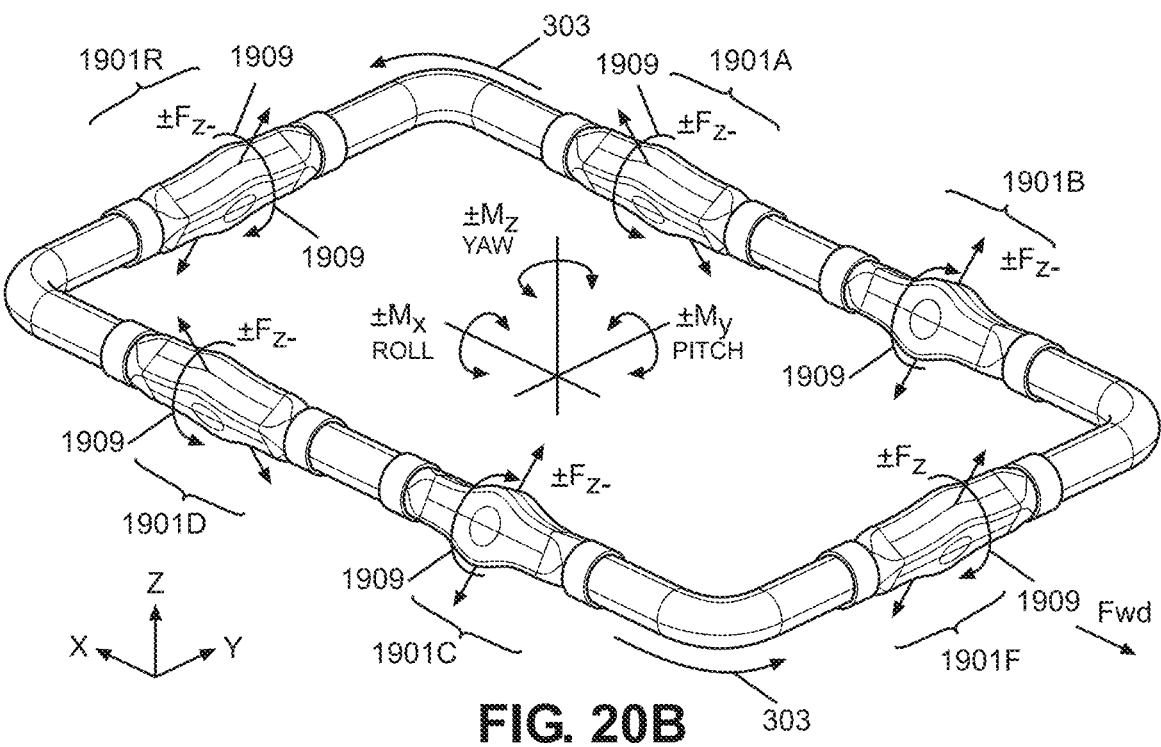
FIG. 20B is a perspective view of the circuit-based vehicle illustrated in FIG. 19A.

FIGS. 20A and 20B are perspective views of the circuit-based vehicle 100 illustrating how the actuating collars 1903 work in pairs 2001 to rotate the cylinder casings 1907. In this embodiment, there may be six rotating archway assemblies 1901A-1901D, 1901F and 1901R. Each rotating archway assembly 1901 includes its own pair of actuating collars 1903 at opposing ends of the cylinder casings 1907. In a default position as shown in FIG. 20A, all rotating archway assemblies 1901 may provide the aerial vehicle 100 with lift. However, when rotated according to FIG. 20B, directional force is applied to the aerial vehicle 100 availing it to navigation. In other words, when rotated the force created by the Magnus Effect is redirected thereby redirecting navigational force for the aerial vehicle 100.

As shown, rotating archway assemblies 1901F and 1901R at the front and the rear of the aerial vehicle 100 are rotated in a manner consistent with the top of the medial archways 1905 angled forward and their bottom medial archways 1905 angled backward. This may reduce lift, but create forward thrust. The rotational cylinders 201 may increase their spin to restore vertical lift while generating forward thrust. Likewise, the rotational cylinders 201 within archway assemblies 1901F and 1901R may vary their spin rate or direction to create dissimilar forces enabling control of vehicle pitch, My.

Furthermore, rotational assemblies 1901A and 1901D are rotated 1909 in a manner consistent with the top of the medial archways 1905 angled toward the starboard and their bottom medial archways 1905 angled toward the port. By way of non-limiting example, this may be to move the vehicle laterally or resist a lateral wind. Additionally, rotational assemblies 1901B and 1901C are rotated 1909 in a manner consistent with the top of the medial archways 1905 angled toward the port and their bottom medial archways 1905 angled toward the starboard. This may be done to create a rotational moment Mz to YAW to steer the aerial vehicle 100. Likewise, the rotational cylinders 201 within archway assemblies 1901C and 1901D may vary their spin rate or direction relative to archway assemblies 1901A and 1901B to create dissimilar forces enabling control of vehicle roll, Mx.

Figure 21:
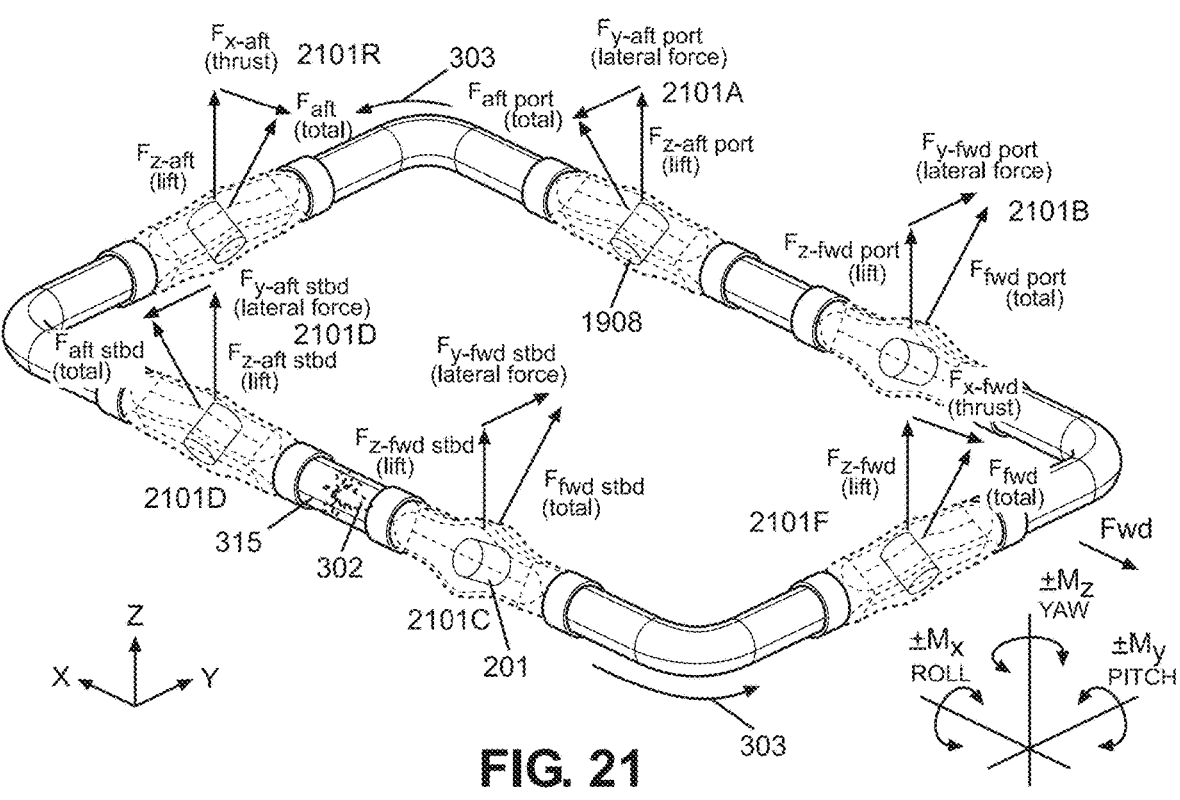
FIG. 21 is a perspective view of the circuit-based vehicle illustrated in FIG. 19A.
Figure 22A:
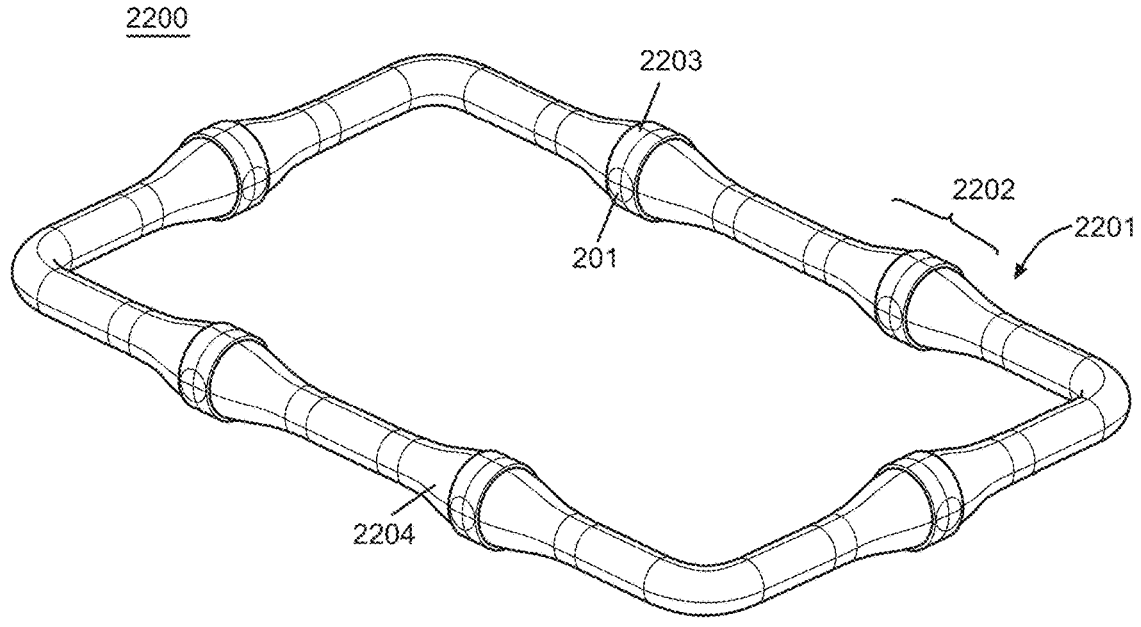
FIG. 22A is a perspective view of a circuit-based vehicle according to another embodiment of the invention.
Figure 22B:
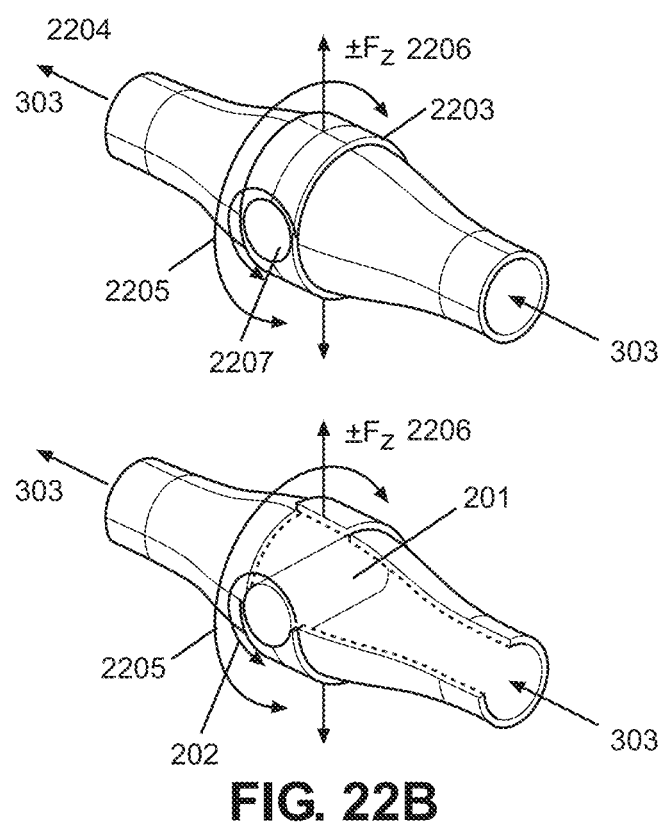
FIG. 22B are perspective views of componentry found in the circuit-based vehicle illustrated in FIG. 22A.
Figure 23:
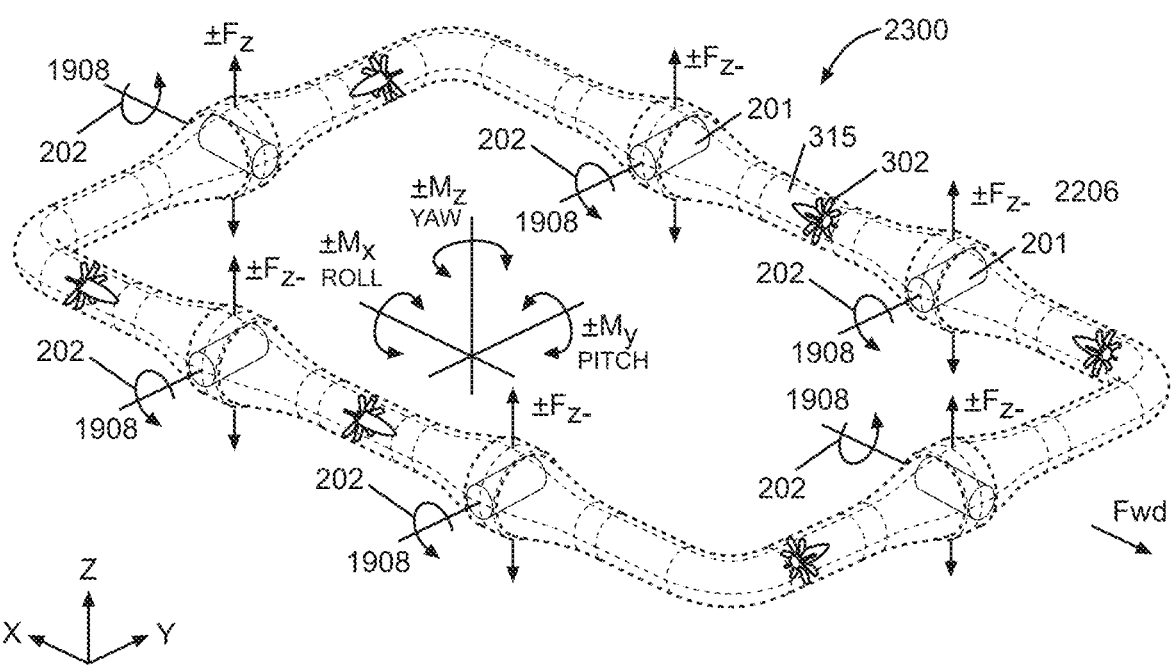
FIG. 23 is an interior perspective view of the circuit-based vehicle illustrated in FIG. 22A.

FIG. 21 illustrates how the angle of the cylinder casings 1907 and medial archways 1905 reorients the rotational cylinders 201 consistent with the angle of their medial archways 1905. Here, the force vector components associated with each rotating archway assembly 1901 are shown. Rotating archway assemblies 1901F and 1901R at the front and the rear of the aerial vehicle 100 are rotated in a manner to provide thrust force components Fx-aft and Fx-fwd to propel the vehicle forward. The lateral force vector components Fy-aft port and Fy-aft stbd of archway assemblies 1901A, 1901D are oriented in the opposite direction to archway assemblies 1901B and 1901C, generating lateral force vector components Fy-fwd port and Fy-fwd stbd. As shown, the rotational cylinders 201 positioned as 2101B and 2101C are oriented similarly and the rotational cylinders 201 positioned as 2101A and 2101D are positioned similarly. This creates the aerial vehicle 100 YAW moment Mz.

In some embodiments, the archway assemblies 1901 may include an arched casing with a cylinder ramp 1501 at one end and an opposing semi-oval end 1502. It may have a plurality of rotational cylinders 201 within the casing and respective airfoil bridges 1503 between the rotational cylinders 201. The airfoil bridges 1503 and cylinder ramps 1501 may be structured to create a cambered hybrid magnus lift airfoil assembly generating directional force to the aerial vehicle 100. Furthermore, the degree to which the louvered doors 1551 may be vented may be based on spin rate of the plurality of rotational cylinders and rate of air flow 303 through the circuit-based vehicle 100. The plurality of rotational cylinders may include at least one of two and three or more rotational cylinders configured in a parallel orientation In some embodiments, the medial archways 1905 may include slidable air vents 1650 or louvered doors 1551 configured to open the enclosed air duct circuit 1902 and allow for airflow 303 to escape. Louvered doors 1551 may slidably engage a track along the arched casing ridges. The actuating louvered doors 1551 may be structured to open, close, partially open and partially close to control vehicle venting. Furthermore, in some embodiments, the archway assembly casing may include a semi-permeable mesh surface 1557.

FIGS. 22A, 22B, 23 and 24 illustrate a circuit-based vehicle 100 according to another embodiment of the invention. This embodiment is illustrated as having an enclosed air duct circuit 2201 including a plurality of fans 302 within respective fan tunnels 315. It may have a plurality of rounded cylinder assemblies 2202 including respective bulbous cylinder casings 2204 with medial actuating collars 2203. Like the other embodiments, it may include rotational cylinders 201 rotatable along their longitudinal axes. The actuating collars 2203 are structured to spin their respective rotational cylinders 201 along their longitudinal axes and orient the rotational cylinders 201 in different positions along their medial axes. As shown, the aerial vehicle 100 includes at least a pair of rounded cylinder assemblies 2202 on a right and left side of the circuit-based vehicle 100 and at least one rounded cylinder assembly 2202 at the front and rear of the circuit-based vehicle 100. Unlike the previous embodiment, this embodiment spins only the actuating collars 2203 rather than the entire rounded cylinder assembly 2202. Therefore, when the rotating collar 2203 is spun 2205, the respective rotational cylinder 201 is spun along with it and reoriented accordingly.

The respective rotational cylinders 201 are structured to provide directional force to the circuit-based vehicle 100 when airflow 303 generated by the plurality of fans 302 passes over the rotational cylinders 201 while rotating 202 about their longitudinal axes 1908. Like the other embodiments, directional force is one of lift 2206, negative lift, spin, and thrust depending on the orientation of the rotational cylinders 201 along their medial axes and the orientation of the rotational cylinders 201 is controllable by a control unit directing the movement of the actuating collars 2203. The respective rotational cylinders 201 are attached to respective actuating collars 2203 at opposing ends 2207 of the rotational cylinders 201, but are still able to rotate along their longitudinal axes 1908.

Figure 24:
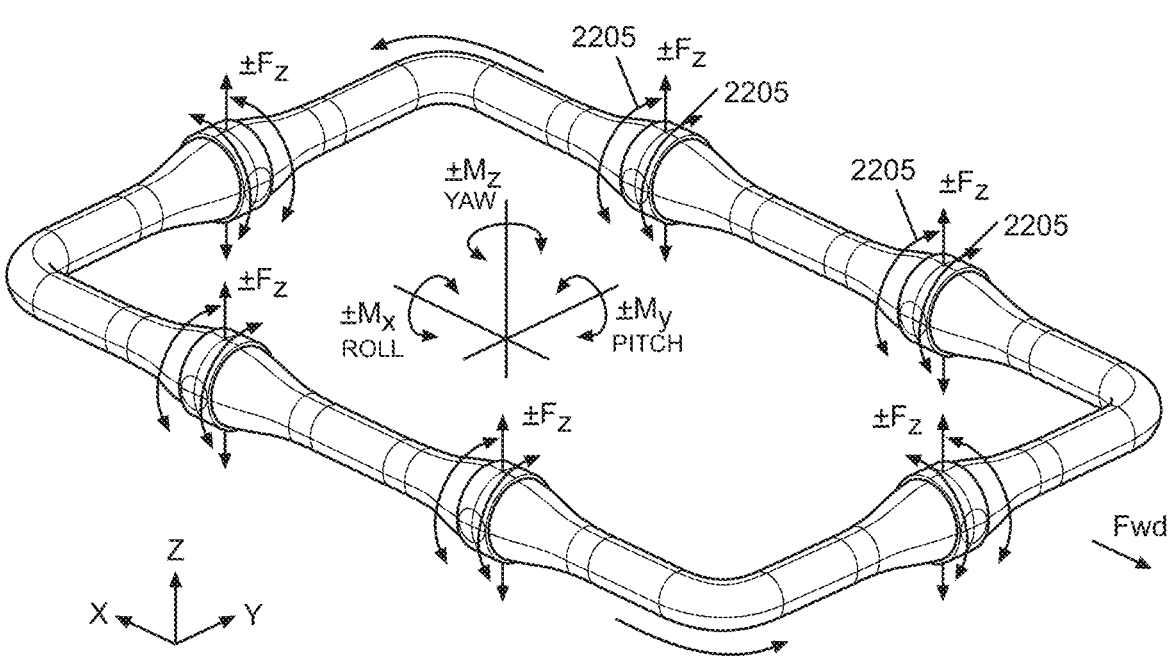
FIG. 24 is a perspective view of the circuit-based vehicle illustrated in FIG. 22A.

FIG. 24 illustrates the aerial vehicle 100 in a default position whereby the rotational cylinders 201 are oriented parallel with horizontal and spinning to create pure lift 2206.

Therefore, the aerial vehicle 100 is lifting as they are spinning and airflow 303 is passing over them.

Figure 25:
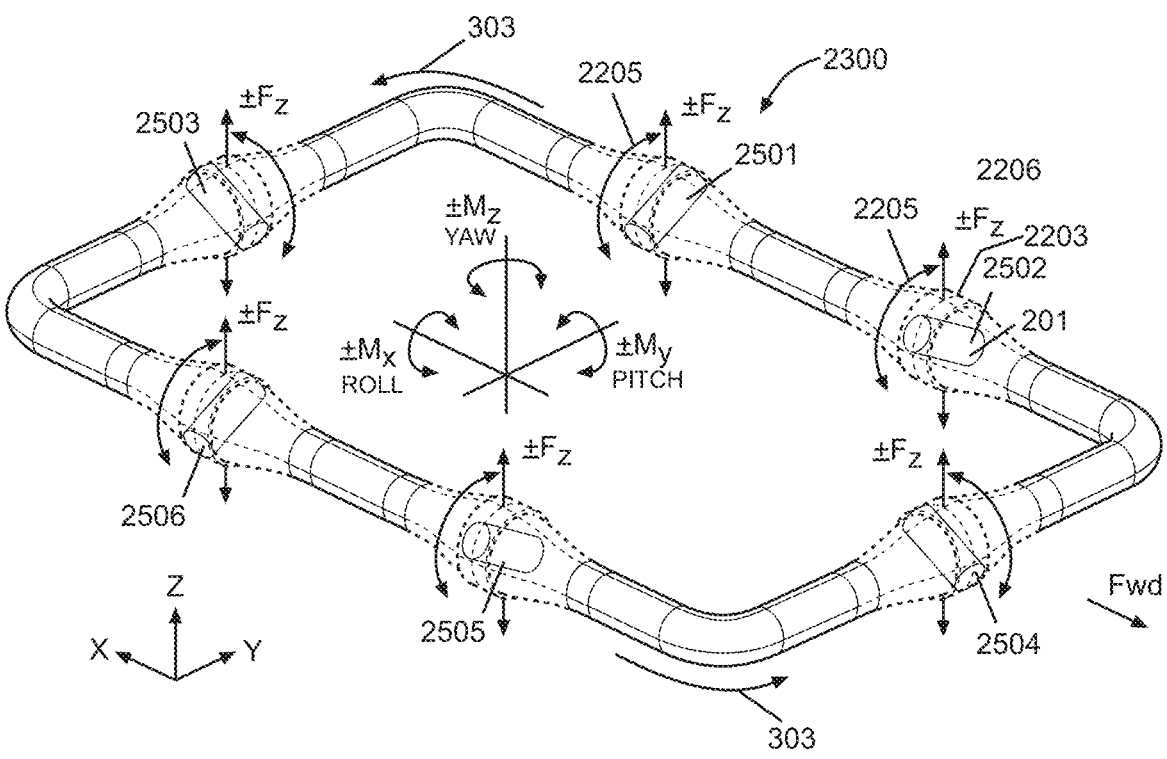
FIG. 25 is a perspective and interior view of the circuit-based vehicle illustrated in FIG. 22A.
Figure 26:
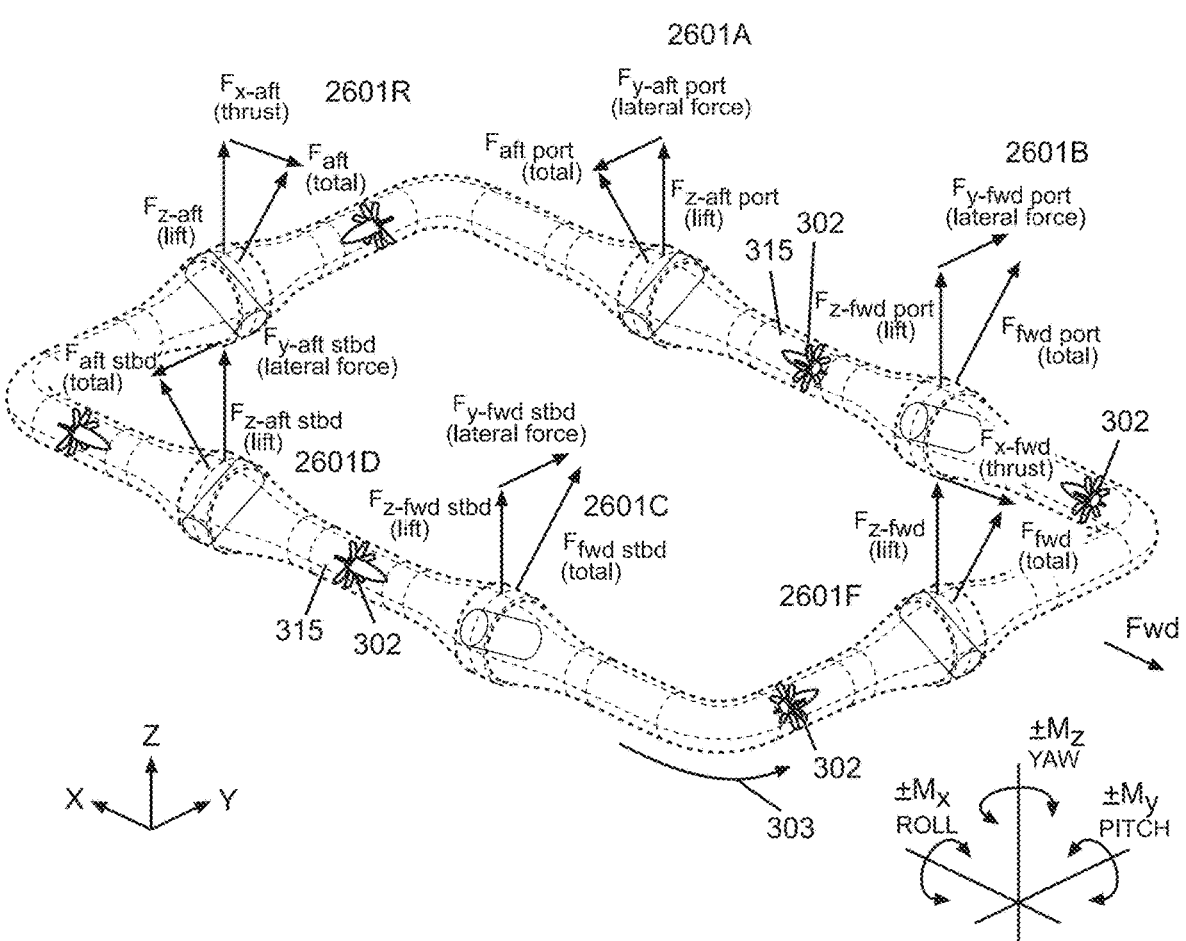
FIG. 26 is a perspective interior view of the circuit-based vehicle illustrated in FIG. 22A.

FIG. 25 and FIG. 26 illustrate how rotating the cylinder collars 2203 and resulting rotational cylinders 201 applies directional force to the aerial vehicle 100. Here, rotational cylinders 2503 and 2504 located at the rear and front of the aerial vehicle 100 respectively are shown as rotated forward thereby reducing vertical lift Fz but creating a forward thrust Fx. However, the rotational cylinders 201 have the ability to increase their spin rate to restore vertical lift while generating forward thrust. Likewise, they may vary their spin or direction to create dissimilar forces and control the vehicle pitch, My.

Rotating cylinder collars and respective rotational cylinders 2501, 2502, 2505 and 2506 are shown as being reoriented away from horizontal to create differing directional forces. Rotational cylinders 2501 and 2506 are shown as being oriented with their top facing the starboard and bottom facing the port. This may be done to create lateral force or to resist a lateral wind. Likewise, rotational cylinders 2502 and 2505 are shown with their top facing port and bottom facing the starboard. This may be done to create a rotational moment Mz to YAW to steer the aerial vehicle 100. Likewise, the rotational cylinders 2505 and 2506 may vary their spin rate or direction relative to rotational cylinders 2501 and 2502 to create dissimilar forces enabling control of vehicle roll, Mx.

FIG. 26 specifically illustrates force vector components associated with each rotational cylinder 201. Assemblies 2504 and 2503 rotate to create thrust force components Fx-aft and Fx-fwd and thrust the vehicle either forward or in reverse. Lateral force vector components 2502, 2505 or F-y-fwd port and F-y-fwd stbd are oriented in the opposite direction to 2501, 2506 or Fy-aft port and F-y-aft stbd to create vehicle YAW moment Mx.

The invention claimed is:

1. A circuit-based vehicle archway assembly comprising:
   an arched casing comprising a cylinder ramp at one end and an opposing semi-oval end;
   a plurality of rotational cylinders within the casing; and
   respective airfoil bridges between the rotational cylinders;
   wherein the airfoil bridges and cylinder ramps are configured to create a cambered hybrid magnus lift airfoil assembly generating directional force to a circuit-based vehicle.

2. The circuit-based vehicle archway assembly of claim 1 wherein the casing comprises actuating louvered doors that slidably engage a track along the arched casing ridges.

3. The circuit-based vehicle archway assembly of claim 2 wherein the actuating louvered doors are configured to open, close, partially open and partially close to control venting; and wherein the degree to which the louvered doors are vented is based on the spin rate of the plurality of rotational cylinders and rate of air flow through the circuit-based vehicle.

4. The circuit-based vehicle archway assembly of claim 1 wherein the archway assembly casing comprises a semi-permeable mesh surface.

5. The circuit-based vehicle archway assembly of claim 1 wherein the plurality of rotational cylinders comprises at least one of two and three rotational cylinders configured in a parallel orientation.

* * * * *